US012634070B2

(12) United States Patent
Dai et al.

(10) Patent No.: US 12,634,070 B2
(45) Date of Patent: May 19, 2026

(54) COMMUNICATION METHOD AND APPARATUS AND NETWORK ARCHITECTURE

(71) Applicant: HUAWEI TECHNOLOGIES CO., LTD., Shenzhen (CN)

(72) Inventors: Mingzeng Dai, Shenzhen (CN); Chenghui Peng, Shanghai (CN); Jianjun Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 380 days.

(21) Appl. No.: 18/075,171

(22) Filed: Dec. 5, 2022

(65) Prior Publication Data

US 2023/0108740 A1      Apr. 6, 2023

Related U.S. Application Data

(63) Continuation of application No. PCT/CN2021/097974, filed on Jun. 2, 2021.

(30) Foreign Application Priority Data

Jun. 5, 2020    (CN) .......................... 202010506718.3

(51) Int. Cl.
*H04W 72/0453* (2023.01)
*H04L 5/00* (2006.01)
*H04W 74/0833* (2024.01)

(52) U.S. Cl.
CPC ....... *H04L 5/0048* (2013.01); *H04W 72/0453* (2013.01); *H04W 74/0833* (2013.01)

(58) Field of Classification Search
CPC ..... H04W 74/08; H04W 76/11; H04W 76/10; H04W 72/0453; H04W 74/0833; H04L 5/0048; H04L 5/0044; H04L 5/0053
See application file for complete search history.

(56) References Cited

U.S. PATENT DOCUMENTS 9,204,411 B2 * 12/2015 Chen ................. H04W 56/0045
2013/0286958 A1 * 10/2013 Liang ................ H04W 74/0866
370/329

(Continued)

FOREIGN PATENT DOCUMENTS

CN       110035479 A    7/2019
CN       110149712 A    8/2019

(Continued)

*Primary Examiner* — Kwang B Yao
(74) *Attorney, Agent, or Firm* — Leydig, Voit & Mayer, Ltd.

(57) ABSTRACT
A communication method and apparatus communicating to a network architecture are provided. The network architecture includes a control unit and one or more service units. The control unit is connected to the one or more service units. The method implemented by a terminal device includes: receiving a first message from the control unit, wherein the first message includes common control information of the one or more service units; and establishing a data transmission channel with a first service unit in the one or more service units based on the first message, wherein the data transmission channel is used to transmit data between the terminal device and the first service unit. According to this application, complete decoupling of a control plane and a user plane may be implemented, thus the control plane and the user plane can be transmitted on different carriers, thereby improving flexibility of communicating in different scenarios.

20 Claims, 13 Drawing Sheets

(56)          References Cited

U.S. PATENT DOCUMENTS

2013/0301541 A1 * 11/2013  Mukherjee ........ H04W 74/0833
                                              370/329
2014/0226621 A1 *  8/2014  Choi ................. H04W 36/0061
                                              370/331
2016/0330670 A1 * 11/2016  Konno ................ H04W 36/302
2019/0394738 A1 * 12/2019  Abedini ........... H04W 56/0015
2022/0264634 A1 *  8/2022  Babaei ................. H04W 72/23

FOREIGN PATENT DOCUMENTS

CN          108886771  B     12/2022
JP         2019075596  A  *   5/2019   ........... H04W 16/14
TW          201705709  A  *  12/2017   ............ H04L 1/854
WO     WO-2019088599 A1  *   5/2019
WO         2020003005 A1      1/2020

* cited by examiner

| Control unit | Service unit | |
|---|---|---|
| RRC | SDAP | |
| PDCP | PDCP | |
| RLC | RLC | RLC |
| MAC | MAC | MAC |
| PHY | PHY | PHY |

| Control unit | Service unit | |
|---|---|---|
| RRC | SDAP | |
| PDCP | PDCP | |
| RLC | RLC | |
| MAC | MAC | |
| PHY | PHY | PHY |
| | Carrier 1 | Carrier 2 |

| R | First TA value | |
|---|---|---|
| First TA value | | Second TA value |
| Second TA value | | |
| Uplink resource allocation UL-Grant | | |
| First identifier | | |
| First identifier | | |

COMMUNICATION METHOD AND APPARATUS AND NETWORK ARCHITECTURE

CROSS-REFERENCE TO RELATED APPLICATIONS

This application is a continuation of International Application No. PCT/CN2021/097974, filed on Jun. 2, 2021, which claims priority to Chinese Patent Application No. 202010506718.3, filed on Jun. 5, 2020. The disclosures of the aforementioned applications are hereby incorporated by reference in their entireties.

TECHNICAL FIELD

Embodiments of this application relate to the field of communication technologies, and in particular, to a communication method and apparatus and a network architecture.

BACKGROUND

With continuous update of a communication scenario and a communication requirement, more requirements are imposed on a radio communication system. In a fifth-generation (5th generation, 5G) communication system, each carrier or each cell has a control channel and a data channel, and a proportion of the control channel in time domain is extremely large. Consequently, overheads of common control information are excessively large. Due to mobility of a terminal device, cell handover occurs when the terminal device moves across cells. Therefore, many control signaling needs to be exchanged between the terminal device and a network device, and consequently, excessive signaling overheads are caused, and frequent cell handover affects a service of the terminal device.

A conventional wireless network architecture and a conventional communication procedure need to be further optimized to meet more communication requirements.

SUMMARY

Embodiments of this application provide a communication method and apparatus and a network architecture, to optimize a wireless network architecture and a communication procedure in the wireless network architecture to meet more communication requirements.

According to a first aspect, a network architecture is provided, and the network architecture may include a control unit and one or more service units. The control unit is connected to the one or more service units. The control unit is configured to send common control information of the one or more service units to a terminal device. The service unit is configured to establish a data transmission channel with the terminal device, and the data transmission channel is used to transmit data between the terminal device and the service unit. In this network architecture, complete decoupling of a control plane and a user plane can be implemented. In this way, the control plane and the user plane can be transmitted on different carriers, and do not need to be bound to a same carrier. This avoids a case in which a proportion of a control channel in time domain of a carrier is large, and reduces overheads of common control information. That the control unit sends common control information of all service units corresponding to the control unit may be considered as that all the service units corresponding to the control unit reduce inter-cell handover of the terminal device in a same cell. In this way, signaling overheads of cell handover are reduced, and service continuity and quality of the terminal device are improved. The network architecture is more flexible, and can adapt to more communication scenarios and meet more communication requirements.

In a possible design, the control unit has functions of one or more of the following protocol layers: a radio resource control (RRC) layer, a packet data convergence protocol (PDCP) layer, a first radio link control RLC layer, a first media access control (MAC) layer, or a first physical (PHY) layer, and the service unit has functions of one or more of the following protocol layers: a service data adaptation protocol (SDAP) layer, a PDCP layer, a second RLC layer, a second MAC layer, or a second PHY layer.

According to a second aspect, a communication method is provided, and the method may be applied to the network architecture provided in the first aspect. The method includes: The terminal device receives a first message from the control unit, where the first message includes common control information of the one or more service units; and the terminal device establishes a data transmission channel with a first service unit in the one or more service units based on the first message, where the data transmission channel is used to transmit data between the terminal device and the first service unit. Through decoupling of the control unit and the service unit, the control unit provides network camping and network discovery and access, and the common control information may be transmitted on a low frequency carrier to implement relatively wide coverage. For example, the common control information may be transmitted in frequency domain below 3 GHZ (sub 3G). The service unit is user-centered, and a plurality of service units can provide a plurality of paths of data and flexibly collaborate with each other. User data of the service unit may be transmitted at a high frequency, for example, may be transmitted in frequency domain of 6 GHz or a millimeter microwave (mm Wave), and because high-frequency bandwidth has a high rate and provides a capacity gain, a peak rate of terabits per second (Tbps) can be implemented. Through decoupling of the control unit and the service unit, the common control information and the user data are prevented from being bound to a same high-frequency carrier for transmission, and frequent handover of the terminal device when moving in a cell due to small coverage of the high-frequency bandwidth is further avoided. Through decoupling of the control unit and the service unit, because the common control information can be transmitted on a low-frequency carrier, and the user data of the service unit can be transmitted on a high-frequency carrier, a handover frequency of the terminal device is reduced, and mobility performance of the terminal device is improved.

In a possible design, the common control information includes random access information separately corresponding to the one or more service units. The method further includes: The terminal device selects the first service unit in the one or more service units; and the terminal device performs random access to the first service unit based on random access information corresponding to the first service unit. Random access to any service unit selected by the terminal device may be implemented by using common control information of the control unit.

In a possible design, that the terminal device performs random access to the first service unit based on random access information corresponding to the first service unit includes: The terminal device sends a random access preamble to the first service unit; and the terminal device receives a random access response RAR message from the first service unit.

In a possible design, the RAR message includes first timing adjustment information between the terminal device and the first service unit and second timing adjustment information between the terminal device and the control unit. Because the terminal device separately communicates with the control unit and the first service unit, when timing adjustment is separately performed by using corresponding timing adjustment information, respective uplink synchronization with the control unit and the first service unit can be ensured.

In a possible design, the first timing adjustment information and the second timing adjustment information are carried in a same MAC RAR: or the first timing adjustment information is carried in a first media access control MAC RAR, and the second timing adjustment information is carried in a second MAC RAR.

In a possible design, a header of the first MAC RAR carries first indication information, and the first indication information is used to indicate that the first MAC RAR carries the timing adjustment information between the terminal device and the first service unit; and a header of the second MAC RAR carries second indication information, and the second indication information is used to indicate that the second MAC RAR carries timing adjustment information between the terminal device and a second service unit.

In a possible design, the RAR message includes a first identifier of the terminal device and a second identifier of the terminal device. Alternatively, the method further includes: The terminal device sends a message 3 to the first service unit, and the terminal device receives a message 4 from the first service unit. The RAR message includes the first identifier of the terminal device, and the message 4 includes the second identifier of the terminal device: or the RAR message includes the second identifier of the terminal device, and the message 4 includes the first identifier of the terminal device. The first identifier is allocated by the first service unit to the terminal device, and the second identifier is allocated by the control unit to the terminal device. Because the terminal device separately communicates with the control unit and the first service unit, the first service unit may identify the terminal device by using the first identifier, and the control unit may identify the terminal device by using the second identifier.

In a possible design, the RAR message includes a first identifier of the terminal device. The method further includes: The terminal device receives a second identifier of the terminal device from the control unit. The second identifier may be allocated by the first service unit and used by the control unit to identify the terminal device, or may be allocated by the control unit.

In a possible design, the method further includes: The terminal device sends a message 3 to the first service unit, and the terminal device receives a message 4 from the first service unit, where the message 3 includes a first RRC message; and the terminal device receives a second RRC message from the control unit, where the second RRC message is used to respond to the first RRC message. In a random access process, an RRC connection from the terminal device to the first service unit is set up.

In a possible design, the first RRC message is an RRC connection request message, and the second RRC message is an RRC connection setup message: or the first RRC message is an RRC connection resume request message, and the second RRC message is an RRC connection resume message.

In a possible design, the common control information further includes a selection rule, and the selection rule is used by the terminal device to select the first service unit from the one or more service units. For example, the selection rule may include one or more of the following: a service unit with good signal quality is preferably selected, or a service unit with light load is preferably selected. Certainly, another selection rule may alternatively be used. The terminal device may measure signal quality of each service unit, or may measure a load status of each service unit, and select the first service unit from the one or more service units based on the selection rule.

In a possible design, the method further includes: The terminal device sets up an RRC connection to the control unit, where the first message is a third RRC message, and the third RRC message includes an identifier of the first service unit and random access information corresponding to the first service unit; and the terminal device performs random access to the first service unit based on the random access information corresponding to the first service unit. When the terminal device sets up an RRC connection to the control unit, the control unit may select a service unit for the terminal device, to provide more possible implementations.

In a possible design, the method further includes: The terminal device sets up an RRC connection to the control unit; and/or the terminal device performs random access to the control unit.

In a possible design, the method further includes: The terminal device sends a second message to the control unit, where the second message includes one or more of the following information: an identifier of the first service unit or the first identifier allocated by the first service unit to the terminal device. A service unit selection result is indicated to the control unit by using the second message, so that the control unit performs a procedure of adding a service unit to the first service unit.

In a possible design, the second message is used to indicate the control unit to send information about context and a data bearer of the terminal device to the first service unit.

In a possible design, the method further includes: The terminal device communicates with the control unit by using the first identifier; and/or the terminal device communicates with the first service unit by using the second identifier. The first identifier is allocated by the first service unit to the terminal device, and the second identifier is allocated by the control unit to the terminal device.

In a possible design, the method further includes: The terminal device communicates with the control unit by using the first timing adjustment information; and/or the terminal device communicates with the first service unit by using second timing adjustment information. The first timing adjustment information is the timing adjustment information between the terminal device and the first service unit, and the second timing adjustment information is the timing adjustment information between the terminal device and the control unit.

In a possible design, the common control information includes one or more of the following: system information, a paging message, or an RRC message. After an RRC connection is set up between the terminal device and the control unit, the control unit sends an RRC message to the terminal device, or the terminal device sends an RRC message to the control unit. Regardless of whether an RRC connection is set up, the control unit may send the common control information such as system information, a paging message, or a reference signal to the terminal device.

According to a third aspect, a communication method is provided, and the method may be applied to the network architecture described in the first aspect. The method includes: The control unit sends a first message to the terminal device, where the first message includes common control information of the one or more service units. The control unit can transmit common control information of all service units connected to the control unit, and implement complete decoupling of a control plane and a user plane. In this way, the control plane and the user plane can be transmitted on different carriers, and do not need to be bound to a same carrier. This is more flexible and can adapt to more communication scenarios and meet more communication requirements. For example, the common control information can be transmitted on a low-frequency carrier, so that relatively wide coverage can be implemented.

In a possible design, the method further includes: The control unit receives a first radio resource control RRC message from a first service unit in the one or more service units, where the first RRC message is used to request to set up an RRC connection of the terminal device or is used to request to resume an RRC connection of the terminal device; and the control unit sends a second RRC message to the terminal device, where the second RRC message is used to respond to the first RRC message. The control unit is used to set up an RRC connection from the terminal device to the first service unit.

In a possible design, the method further includes: The control unit sets up an RRC connection to the terminal device; and/or the control unit performs a random access procedure with the terminal device.

In a possible design, the method further includes: The control unit receives a second message from the terminal device, where the second message includes one or more of the following information: an identifier of a first service unit in the one or more service units, or a first identifier allocated by a first service unit in the one or more service units to the terminal device; and the control unit sends information about context and a data bearer of the terminal device to the first service unit based on the second message. The control unit is used to set up bearers of the terminal device and the first service unit. This may be applicable to a case in which there is no signaling connection between the first service unit and a core network, so that the first service unit obtains the context of the terminal device.

According to a fourth aspect, a communication method is provided, and the method may be applied to the network architecture described in the first aspect. The method includes: The first service unit establishes a data transmission channel with the terminal device, where the data transmission channel is used to transmit data between the terminal device and the service unit, and the first service unit is a service unit in the one or more service units. The first service unit does not need to perform control-plane signaling interaction with the terminal device. In this way, complete decoupling of a control plane and a user plane may be implemented, and the control plane and the user plane can be transmitted on different carriers, and do not need to be bound to a same carrier. This is more flexible and can adapt to more communication scenarios and meet more communication requirements. For example, common control information can be transmitted on a low-frequency carrier, so that relatively wide coverage can be implemented, and user data of the first service unit can be transmitted on a high-frequency carrier, to provide a capacity gain and a peak rate.

In a possible design, the method further includes: The first service unit receives a random access preamble from the terminal device; and the first service unit returns a random access response RAR message to the terminal device. The RAR message carries one or more of the following information: first timing adjustment information between the terminal device and the first service unit, second timing adjustment information between the terminal device and the control unit, a first identifier of the terminal device, or a second identifier of the terminal device. The first identifier is allocated by the first service unit to the terminal device, and the second identifier is allocated by the control unit to the terminal device. Because the terminal device separately communicates with the control unit and the first service unit, when timing adjustment is separately performed by using corresponding timing adjustment information, respective uplink synchronization with the control unit and the first service unit can be ensured.

In a possible design, the first timing adjustment information and the second timing adjustment information are carried in a same MAC RAR: or the first timing adjustment information is carried in a first media access control MAC RAR, and the second timing adjustment information is carried in a second MAC RAR.

In a possible design, a header of the first MAC RAR carries first indication information, and the first indication information is used to indicate that the first MAC RAR carries the timing adjustment information between the terminal device and the first service unit; and a header of the second MAC RAR carries second indication information, and the second indication information is used to indicate that the second MAC RAR carries timing adjustment information between the terminal device and a second service unit.

In a possible design, the method further includes: The first service unit receives a first radio resource control RRC message from the terminal device, where the first RRC message is used to request to set up an RRC connection of the terminal device or is used to request to resume an RRC connection of the terminal device; and the first service unit sends the first RRC message to the control unit. A solution of how the first service unit sets up an RRC connection to the terminal device in an architecture in which the user plane and the control plane are decoupled is provided.

According to a fifth aspect, a communication apparatus is provided, and the communication apparatus may be applied to the network architecture described in the first aspect. The communication apparatus may be a terminal device, an apparatus (for example, a chip, a chip system, or a circuit) in the terminal device, or an apparatus that can be used together with the terminal device. In a design, the communication apparatus may include corresponding modules for performing the method/operations/steps/actions described in the second aspect. The module may be a hardware circuit or software, or may be implemented in a combination of a hardware circuit and software. In a design, the communication apparatus may include a processing module and a communication module. The processing module is configured to invoke the communication module to perform a receiving and/or sending function. For example:

The communication module is configured to receive a first message from the control unit, and the first message includes common control information of the one or more service units. The processing module is configured to establish a data transmission channel with a first service unit in the one or more service units based on the first message, and the data transmission channel is used to transmit data between the terminal device and the first service unit.

In a possible design, the common control information includes random access information separately corresponding to the one or more service units. The method further includes: The terminal device selects the first service unit in the one or more service units; and the terminal device performs random access to the first service unit based on random access information corresponding to the first service unit. Random access to any service unit selected by the terminal device may be implemented by using common control information of the control unit.

In a possible design, the communication module is configured to: send a random access preamble to the first service unit, and receive a random access response RAR message from the first service unit.

In a possible design, the RAR message includes first timing adjustment information between the terminal device and the first service unit and second timing adjustment information between the terminal device and the control unit.

In a possible design, the first timing adjustment information and the second timing adjustment information are carried in a same MAC RAR: or the first timing adjustment information is carried in a first media access control MAC RAR, and the second timing adjustment information is carried in a second MAC RAR.

In a possible design, a header of the first MAC RAR carries first indication information, and the first indication information is used to indicate that the first MAC RAR carries the timing adjustment information between the terminal device and the first service unit; and a header of the second MAC RAR carries second indication information, and the second indication information is used to indicate that the second MAC RAR carries timing adjustment information between the terminal device and a second service unit.

In a possible design, the RAR message includes a first identifier of the terminal device and a second identifier of the terminal device. Alternatively, the method further includes: The terminal device sends a message 3 to the first service unit, and the terminal device receives a message 4 from the first service unit. The RAR message includes the first identifier of the terminal device, and the message 4 includes the second identifier of the terminal device: or the RAR message includes the second identifier of the terminal device, and the message 4 includes the first identifier of the terminal device. The first identifier is allocated by the first service unit to the terminal device, and the second identifier is allocated by the control unit to the terminal device.

In a possible design, the RAR message includes a first identifier of the terminal device. The method further includes: The terminal device receives a second identifier of the terminal device from the control unit. The second identifier may be allocated by the first service unit and used by the control unit to identify the terminal device, or may be allocated by the control unit.

In a possible design, the communication module is further configured to: send a message 3 to the first service unit, and receive a message 4 from the first service unit, where the message 3 includes a first RRC message; and receive a second RRC message from the control unit, where the second RRC message is used to respond to the first RRC message. In a random access process, an RRC connection from the terminal device to the first service unit is set up.

In a possible design, the first RRC message is an RRC connection request message, and the second RRC message is an RRC connection setup message: or the first RRC message is an RRC connection resume request message, and the second RRC message is an RRC connection resume message.

In a possible design, the common control information further includes a selection rule, and the selection rule is used by the terminal device to select the first service unit from the one or more service units. For example, the selection rule may include one or more of the following: a service unit with good signal quality is preferably selected, or a service unit with light load is preferably selected. Certainly, another selection rule may alternatively be used. The terminal device may measure signal quality of each service unit, or may measure a load status of each service unit, and select the first service unit from the one or more service units based on the selection rule.

In a possible design, the processing module is further configured to: set up an RRC connection to the control unit, where the first message is a third RRC message, and the third RRC message includes an identifier of the first service unit and random access information corresponding to the first service unit; and perform random access to the first service unit based on the random access information corresponding to the first service unit.

In a possible design, the processing module is further configured to: set up an RRC connection to the control unit; and/or perform random access to the control unit.

In a possible design, the communication module is further configured to send a second message to the control unit, where the second message includes one or more of the following information: an identifier of the first service unit or the first identifier allocated by the first service unit to the terminal device. A service unit selection result is indicated to the control unit by using the second message, so that the control unit performs a procedure of adding a service unit to the first service unit.

In a possible design, the second message is used to indicate the control unit to send information about context and a data bearer of the terminal device to the first service unit.

In a possible design, the communication module is further configured to: communicate with the control unit by using the first identifier; and/or communicate with the first service unit by using the second identifier. The first identifier is allocated by the first service unit to the terminal device, and the second identifier is allocated by the control unit to the terminal device.

In a possible design, the communication module is further configured to: communicate with the control unit by using the first timing adjustment information; and/or communicate with the first service unit by using second timing adjustment information. The first timing adjustment information is the timing adjustment information between the terminal device and the first service unit, and the second timing adjustment information is the timing adjustment information between the terminal device and the control unit.

In a possible design, the common control information includes one or more of the following: system information, a paging message, or an RRC message. After an RRC connection is set up between the terminal device and the control unit, the control unit sends an RRC message to the terminal device, or the terminal device sends an RRC message to the control unit. Regardless of whether an RRC connection is set up, the control unit may send the common control information such as system information, a paging message, or a reference signal to the terminal device.

For beneficial effects of the fifth aspect and possible designs, refer to corresponding descriptions in the second aspect. Details are not described again herein.

According to a sixth aspect, a communication apparatus is provided, and the communication apparatus may be applied to the network architecture described in the first aspect. The communication apparatus may be a control unit, an apparatus (for example, a chip, a chip system, or a circuit) in the control unit, or an apparatus that can be used together with the control unit. In a design, the communication apparatus may include corresponding modules for performing the method/operations/steps/actions described in the third aspect. The module may be a hardware circuit or software, or may be implemented in a combination of a hardware circuit and software. In a design, the communication apparatus may include a processing module and a communication module. The processing module is configured to invoke the communication module to perform a receiving and/or sending function. For example:

The processing module is configured to invoke the communication module to send a first message to the terminal device, where the first message includes common control information of the one or more service units.

In a possible design, the communication module is configured to: receive a first radio resource control RRC message from a first service unit in the one or more service units, where the first RRC message is used to request to set up an RRC connection of the terminal device or is used to request to resume an RRC connection of the terminal device; and send a second RRC message to the terminal device, where the second RRC message is used to respond to the first RRC message.

In a possible design, the processing module is further configured to: set up an RRC connection to the terminal device; and/or perform a random access procedure with the terminal device.

In a possible design, the communication module is further configured to receive a second message from the terminal device. The second message includes one or more of the following information: an identifier of the first service unit in the one or more service units, or a first identifier allocated by the first service unit in the one or more service units to the terminal device. The control unit sends information about context and a data bearer of the terminal device to the first service unit based on the second message.

For beneficial effects of the sixth aspect and possible designs, refer to corresponding descriptions in the third aspect. Details are not described again herein.

According to a seventh aspect, a communication apparatus is provided, and the communication apparatus may be applied to the network architecture described in the first aspect. The communication apparatus may be a service unit, an apparatus (for example, a chip, a chip system, or a circuit) in the service unit, or an apparatus that can be used together with the service unit. In a design, the communication apparatus may include corresponding modules for performing the method/operations/steps/actions described in the fourth aspect. The module may be a hardware circuit or software, or may be implemented in a combination of a hardware circuit and software. In a design, the communication apparatus may include a processing module and a communication module. The processing module is configured to invoke the communication module to perform a receiving and/or sending function. For example:

The processing module is configured to establish a data transmission channel with the terminal device. The data transmission channel is used to transmit data between the terminal device and the first service unit, and the first service unit is a service unit in the one or more service units.

In a possible design, the communication module is configured to: receive a random access preamble from the terminal device; and/or return a random access response RAR message to the terminal device. The RAR message carries one or more of the following information: first timing adjustment information between the terminal device and the first service unit, second timing adjustment information between the terminal device and the control unit, a first identifier of the terminal device, or a second identifier of the terminal device. The first identifier is allocated by the first service unit to the terminal device, and the second identifier is allocated by the control unit to the terminal device.

In a possible design, the first timing adjustment information and the second timing adjustment information are carried in a same MAC RAR: or the first timing adjustment information is carried in a first media access control MAC RAR, and the second timing adjustment information is carried in a second MAC RAR.

In a possible design, a header of the first MAC RAR carries first indication information, and the first indication information is used to indicate that the first MAC RAR carries the timing adjustment information between the terminal device and the first service unit; and a header of the second MAC RAR carries second indication information, and the second indication information is used to indicate that the second MAC RAR carries timing adjustment information between the terminal device and a second service unit.

In a possible design, the communication module is further configured to: receive a first radio resource control RRC message from the terminal device, where the first RRC message is used to request to set up an RRC connection of the terminal device or is used to request to resume an RRC connection of the terminal device; and send the first RRC message to the control unit.

For beneficial effects of the seventh aspect and possible designs, refer to corresponding descriptions in the fourth aspect. Details are not described again herein.

According to an eighth aspect, a communication apparatus is provided, and the communication apparatus may be applied to the network architecture described in the first aspect. The communication apparatus includes a communication interface and a processor, and the communication interface is used by the communication apparatus to communicate with another device, for example, to receive and receive data or a signal. For example, the communication interface may be a transceiver, a circuit, a bus, a module, or another type of communication interface. The processor is configured to invoke a group of programs, instructions, or data to perform the method described in the second aspect. The communication apparatus may further include a memory, configured to store the program, the instructions, or the data invoked by the processor. The memory is coupled to the processor. When executing the program, the instructions, or the data stored in the memory, the processor may implement the method described in the second aspect.

According to a ninth aspect, a communication apparatus is provided, and the communication apparatus may be applied to the network architecture described in the first aspect. The communication apparatus includes a communication interface and a processor, and the communication interface is used by the communication apparatus to communicate with another device, for example, to receive and receive data or a signal. For example, the communication interface may be a transceiver, a circuit, a bus, a module, or another type of communication interface. The processor is configured to invoke a group of programs, instructions, or data to perform the method described in the third aspect. The communication apparatus may further include a memory, configured to store the program, the instructions, or the data invoked by the processor. The memory is coupled to the processor; and when executing the program, the instructions, or the data stored in the memory, the processor may implement the method described in the third aspect.

According to a tenth aspect, a communication apparatus is provided, and the communication apparatus may be applied to the network architecture described in the first aspect. The communication apparatus includes a communication interface and a processor, and the communication interface is used by the communication apparatus to communicate with another device, for example, to receive and receive data or a signal. For example, the communication interface may be a transceiver, a circuit, a bus, a module, or another type of communication interface. The processor is configured to invoke a group of programs, instructions, or data to perform the method described in the fourth aspect. The communication apparatus may further include a memory, configured to store the program, the instructions, or the data invoked by the processor. The memory is coupled to the processor; and when executing the program, the instructions, or the data stored in the memory, the processor may implement the method described in the fourth aspect.

According to an eleventh aspect, an embodiment of this application further provides a computer-readable storage medium, and the computer-readable storage medium stores computer-readable instructions. When the computer-readable instructions are run on a computer, the method described in the second aspect, the third aspect, the fourth aspect, any possible design of the second aspect, any possible design of the third aspect, or any possible design of the fourth aspect is performed.

According to a twelfth aspect, an embodiment of this application provides a chip system. The chip system includes a processor, and may further include a memory, configured to implement the method described in the second aspect, the third aspect, the fourth aspect, any possible design of the second aspect, any possible design of the third aspect, or any possible design of the fourth aspect. The chip system may include a chip, or include a chip and another discrete device.

According to a thirteenth aspect, an embodiment of this application provides a communication system, and the communication system includes a terminal device, a control unit, and a first service unit. The terminal device is configured to perform the method in the second aspect or any possible design of the second aspect, the control unit is configured to perform the method in the third aspect or any possible design of the third aspect, and the first service unit is configured to perform the method in the fourth aspect or any possible design of the fourth aspect.

According to a fourteenth aspect, a computer program product including instructions is provided; and when the computer program product is run on a computer, the method described in the second aspect, the third aspect, the fourth aspect, any possible design of the second aspect, any possible design of the third aspect, or any possible design of the fourth aspect is performed.

DESCRIPTION OF EMBODIMENTS

Embodiments of this application provide a communication method and apparatus and a network architecture. The method and the apparatus are based on a same inventive concept. Because the method and the apparatus have a similar problem-resolving principle, for implementations of the apparatus and the method, refer to each other, and no repeated description is provided.

In descriptions of embodiments of this application, the term "and/or" describes an association relationship between associated objects and indicates that three relationships may exist. For example, A and/or B may indicate the following three cases: Only A exists, both A and B exist, and only B exists. The character "/" usually indicates an "or" relationship between associated objects. In this application, at least one means one or more, and a plurality of means two or more. In addition, it should be understood that in description of this application, terms such as "first" and "second" are merely used for distinguishing and description, but should not be understood as indicating or implying relative importance, or should not be understood as indicating or implying a sequence.

A communication method provided in embodiments of this application may be applied to a 5G communication system such as 5G new radio (NR), or may be applied to various communication systems in the future, such as a sixth generation (6th generation, 6G) communication system.

Figure 1:
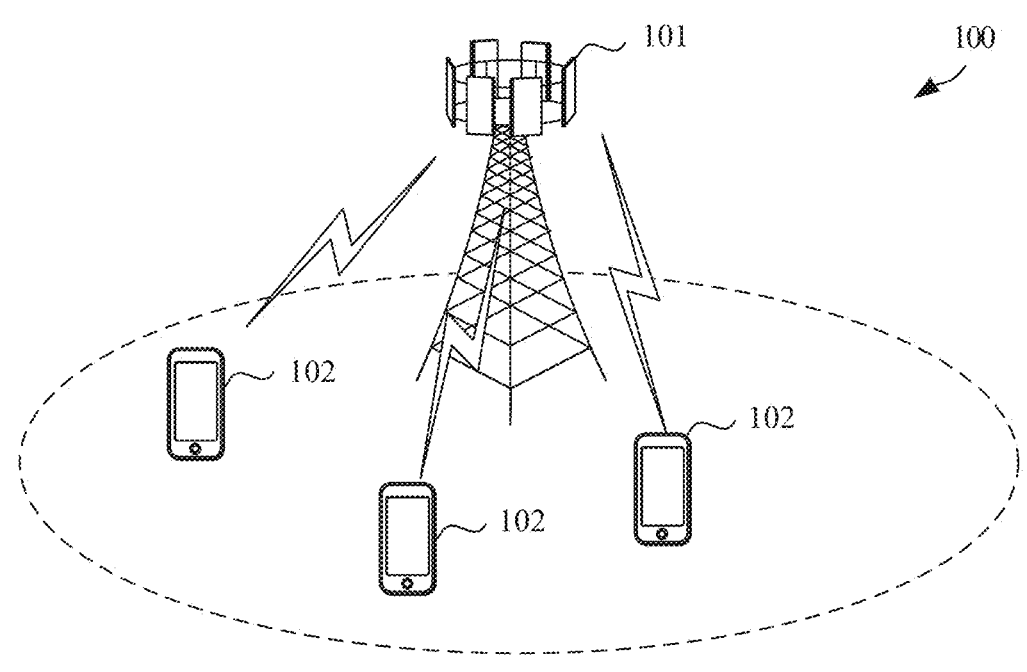
FIG. 1 is a schematic diagram of an architecture of a communication system according to an embodiment of this application.

FIG. 1 shows an architecture of a communication system to which an embodiment of this application is applicable. As shown in FIG. 1, a communication system 100 includes a network device 101 and a terminal 102. The network device 101 provides a service for the terminal 102 in a coverage range of the network device 101. For example, as shown in FIG. 1, the network device 101 provides wireless access for one or more terminals 102 in the coverage range of the network device 101.

The network device 101 is a node in a radio access network (RAN), and may be referred to as a base station, or may be referred to as a RAN node (or device). Currently, some examples of the network device 101 are: a next-generation NodeB (gNB), a next-generation evolved NodeB (Ng-eNB), a transmission reception point (TRP), an evolved NodeB (eNB), a radio network controller (RNC), a NodeB (NB), a base station controller (BSC), a base transceiver station (BTS), a home base station (such as home evolved NodeB, or home Node B. HNB), a baseband unit (base band unit. BBU), or a wireless fidelity (Wi-Fi) access point (AP). The network device 101 may alternatively be a satellite, and the satellite may also be referred to as a high-altitude platform, a high-altitude aircraft, or a satellite base station. The network device 101 may alternatively be another device with a network device function. For example, the network device 101 may alternatively be a device that undertakes a network device function in D2D communication. The network device 101 may alternatively be a network device in a possible future communication system.

The terminal 102, also referred to as user equipment (UE), a mobile station (MS), a mobile terminal (MT), or the like, is a device that provides voice and/or data connectivity for a user. For example, the terminal 102 includes a handheld device, a vehicle-mounted device, or the like with a wireless connection function. Currently, the terminal 102 may be a mobile phone, a tablet computer, a notebook computer, a palmtop computer, a mobile internet device (MID), a wearable device (for example, a smart watch, a smart band, or a pedometer), a vehicle-mounted device (for example, an automobile, a bicycle, an electric car, an airplane, a ship, a train, or a high-speed railway), a virtual reality (VR) device, an augmented reality (AR) device, a wireless terminal in industrial control, a smart home device (for example, a refrigerator, a television set, an air conditioner, or an electricity meter), an intelligent robot, a workshop device, a wireless terminal in self driving, a wireless terminal in a remote medical surgery, a wireless terminal in a smart grid, a wireless terminal in transportation safety, a wireless terminal in a smart city, a wireless terminal in a smart home, or a flight device (for example, an intelligent robot, a hot air balloon, an uncrewed aerial vehicle, or an airplane). The terminal 102 may alternatively be another device with a terminal function. For example, the terminal 102 may be a device that undertakes a terminal function in D2D communication.

An embodiment of this application provides an access network architecture, applied to a network device in an access network. The network device in the access network may be any device described above for the network device 101. An access network architecture provided in this embodiment of this application is described below; and the network device in the access network may be briefly described as a network device.

The access network architecture provided in this embodiment of this application implements common control and data separation, and the network device includes a control unit (CU) and a service unit (SU). It may be understood that both the control unit and the service unit may alternatively be other names. This is not limited in this application. For example, the control unit may also be referred to as a control base station, a control module, a control device, or a control apparatus. The service unit may also be referred to as a service base station, a data base station, a service module, a service apparatus, a data module, or a data apparatus.

The control unit implements some functions of the network device, and the service unit implements some functions of the network device. For example, the control unit may provide common control information for the terminal device. The common control information may include a common control channel, and the common control information may include one or more of the following information: system information, a paging message, a reference signal, and a radio resource control (RRC) message. The reference signal is a signal sent by the network device to discover and measure another device, or a signal sent by the network device for access of the terminal device. The reference signal may be a synchronization signal block (SS/PBCH block, SSB), or may be a channel state information reference signal (CSI-RS), a demodulation reference signal (DMRS), a sounding reference signal (SRS), or another type of reference signal. The system information may be, for example, a master information block (MIB), or may be a system information block (SIB). The service unit may establish a data transmission channel or a data bearer with the terminal device, and the data transmission channel or the data bearer is used for data transmission between the service unit and the terminal device.

Figure 2A:
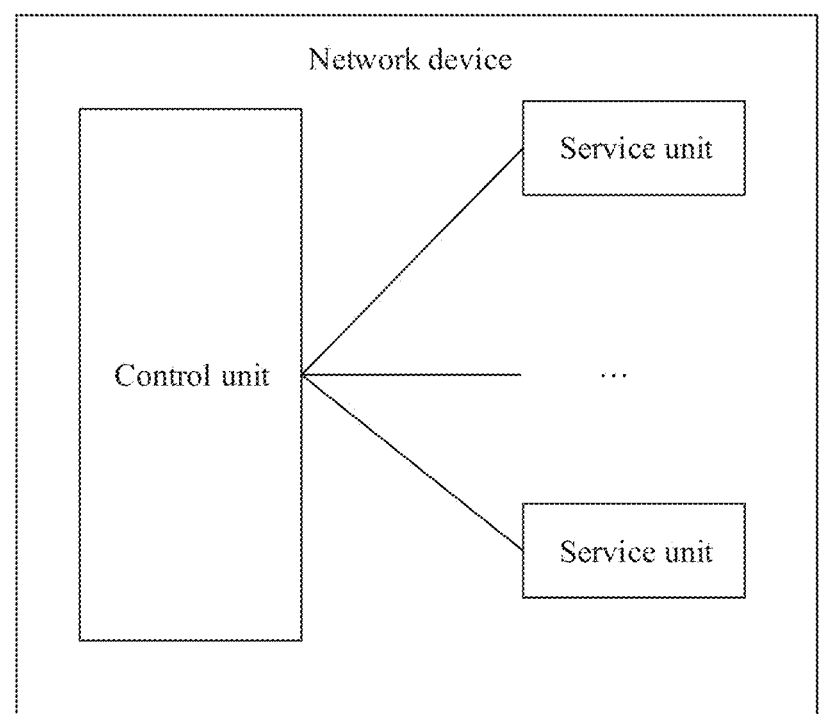
FIG. 2a is a schematic diagram 1 of a structure of a network device according to an embodiment of this application.

The control unit and the service unit may be connected by using an interface. For example, the interface may be X2, Xn, or a similar interface. There may be one or more control units and one or more service units in the network device. Generally, as shown in FIG. 2a, one control unit may be connected to one or more service units, and one service unit is connected to only one control unit: in other words, the control unit and the service unit are in a one-to-many relationship. The control unit provides, for the terminal device, common control information of a service unit connected to the control unit. Certainly, the control unit and the service unit may alternatively be in a many-to-one relationship or a many-to-many relationship. FIG. 2a is an example.

Figure 2B:
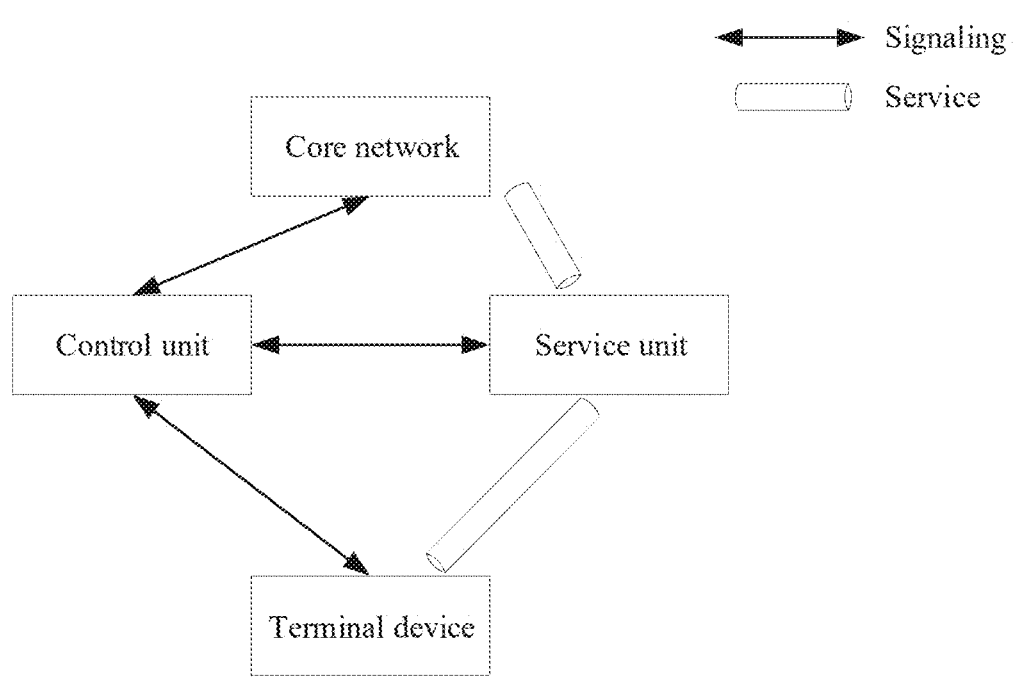
FIG. 2b is a schematic diagram 1 of a connection relationship between devices in a communication system according to an embodiment of this application.
Figure 2C:
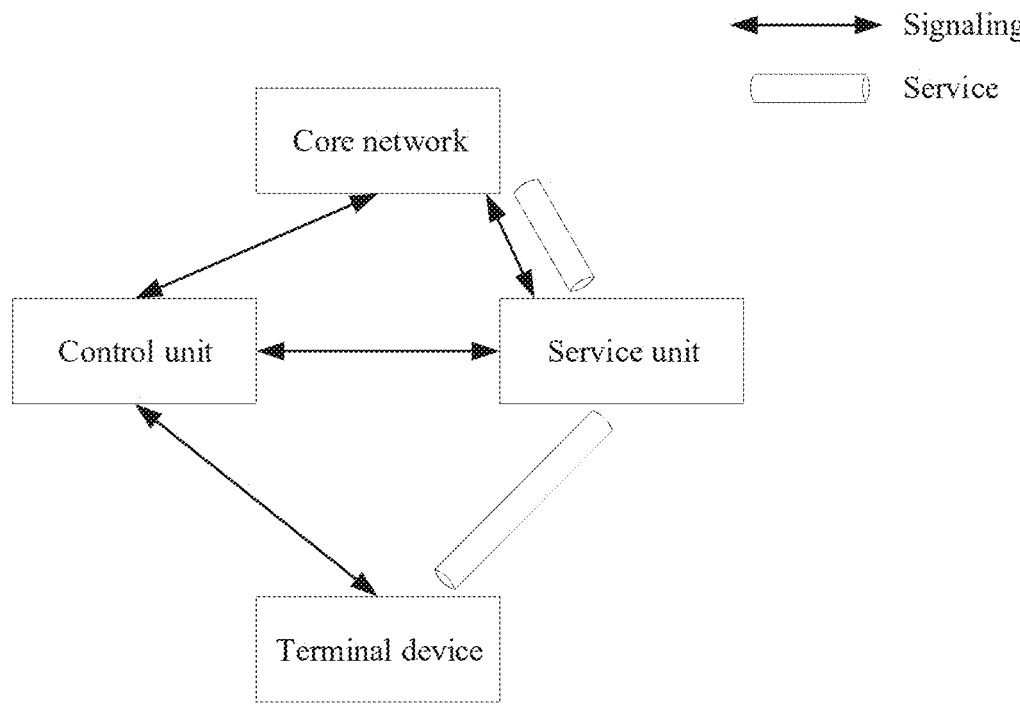
FIG. 2c is a schematic diagram 2 of a connection relationship between devices in a communication system according to an embodiment of this application.

The architecture of the communication system may further include a core network (CN). An interface connection relationship between the terminal device, the control unit, the service unit, and the core network may be shown in FIG. 2b or FIG. 2c. As shown in FIG. 2b, there is a control plane signaling connection but no data connection between the control unit and the core network, and there may be a data connection but no control plane signaling connection between the service unit and the core network. As shown in FIG. 2c, there is a control plane signaling connection but no data connection between the control unit and the core network, and there may be a data connection and a control plane signaling connection between the service unit and the core network.

Optionally, the network device may further include another unit. For example, the network device may further include an active antenna unit (AAU). The AAU implements some physical layer processing functions, radio frequency processing, and a function related to an active antenna.

In addition, in this embodiment of this application, the CU may be classified as a network device in the RAN, or the CU may be classified as a network device in the CN.

Figure 3:
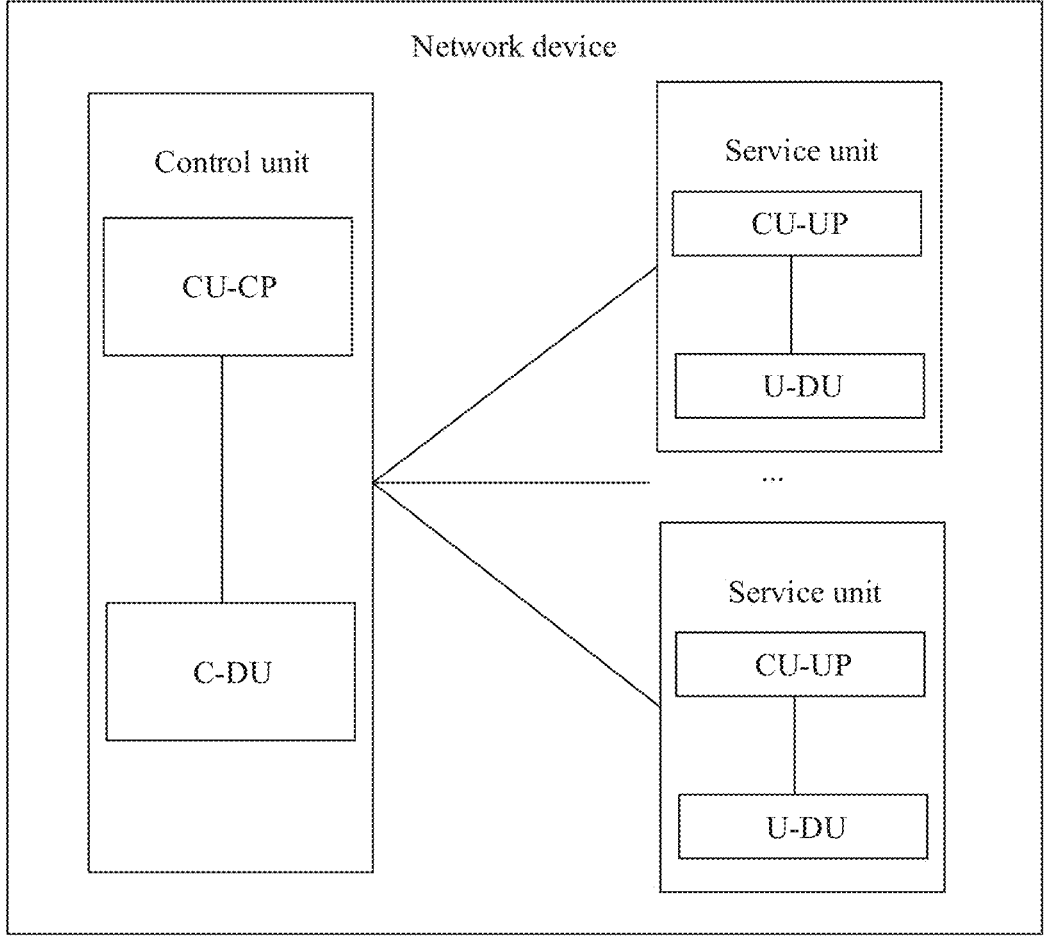
FIG. 3 is a schematic diagram 2 of a structure of a network device according to an embodiment of this application.

In some deployments of the NR, the network device may include a central unit (centralized unit, CU) and a distributed unit (DU). The CU is responsible for processing a non-real-time protocol and service to implement functions of an RRC layer and a PDCP layer. The DU is responsible for processing a physical layer protocol and a real-time service, and implements functions of an RLC layer, a MAC layer, and a PHY layer. The CU decouples a user plane and a control plane to form a CU-control plane (CP) and a CU-user plane (UP). As shown in FIG. 3, based on an architecture in which the CU and the DU are separated in the NR and an architecture of a CU-CP and a CU-UP, a new network architecture provided in this embodiment of this application may be understood as follows: A control unit decouples a user plane and a control plane, the control unit includes a CU-CP and a control plane-DU (C-DU), and a service unit includes a CU-UP and a user plane-DU (U-DU).

In this embodiment of this application, the control unit and the service unit may each have functions of some protocol layers. The control unit may have functions of one or more of the following protocol layers: an RRC layer, a packet data convergence protocol (PDCP) layer, a radio link control (RLC) layer, a media access control (MAC) layer, or a physical (PHY) layer. The service unit may have functions of one or more of the following protocol layers: a service data adaptation protocol (SDAP) layer, a PDCP layer, an RLC layer, a MAC layer, or a PHY layer.

Figures 4A, 4B:
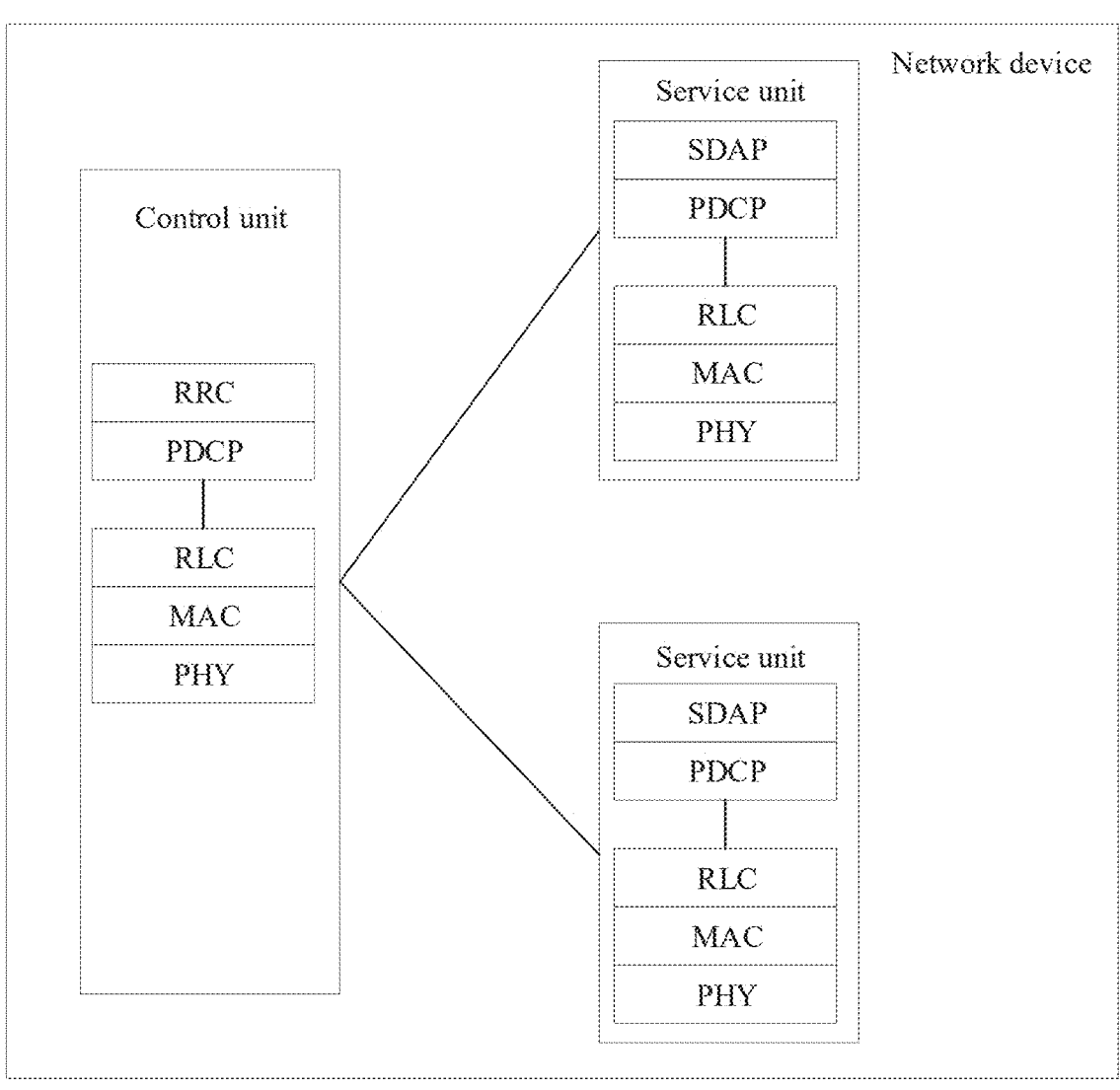
FIG. 4a is a schematic diagram 1 of protocol stacks of a control unit and a service unit according to an embodiment of this application.
FIG. 4b is a schematic diagram 2 of protocol stacks of a control unit and a service unit according to an embodiment of this application.

In a possible design, as shown in FIG. 4a, the control unit has functions of the following several protocol layers: an RRC layer, a PDCP layer, an RLC layer, a MAC layer, or a PHY layer, and the service unit has functions of the following several protocol layers: an SDAP layer, a PDCP layer, an RLC layer, a MAC layer, or a PHY layer. Protocol layer functions of the control unit and the service unit are independent. For example, the control unit has independent functions of the RLC layer, the MAC layer, and the PHY layer, and the service unit has independent functions of the RLC layer, the MAC layer, and the PHY layer. For ease of illustration, as an example in FIG. 4a, one control unit is connected to two service units to perform a protocol layer. RRC may be divided into control plane RRC (C-RRC) and user plane RRC (U-RRC). The C-RRC is used to transfer a common control message such as a SIB, a MIB, or a paging message, and the U-RRC is used to transfer an RRC control message of the terminal device. A protocol layer of the service unit is used to transfer data of the terminal device. In the architecture in which the CU and the DU are separated, the C-RRC, the U-RRC, and PDCP corresponding to the U-RRC are located in the CU-CP, and the DU-CP includes an RLC layer, a MAC layer, and a PHY layer that are corresponding to the control plane; and the SDAP layer and the PDCP layer are located in the CU-UP, and an RLC layer, a MAC layer, and a PHY layer that are corresponding to the user plane are located in the U-DU.

In a possible design, as shown in FIG. 4b, the terminal device may maintain an RRC connection by using a cNB, and perform a plurality of connections on the user plane by connecting a plurality of sNBs. In this case, the plurality of sNBs separately have independent functions of the RLC layer, the MAC layer, and the PHY layer, and the plurality of sNBs have same functions of the SDAP layer and the PDCP layer. In this protocol stack, data of the terminal device may be aggregated from different U-DUs into a PDCP layer of a same CU-UP. FIG. 4b shows a protocol layer of the network device by using an example in which the terminal device is connected to two sNBs to perform a plurality of connections on the user plane.

Figures 4C, 5:
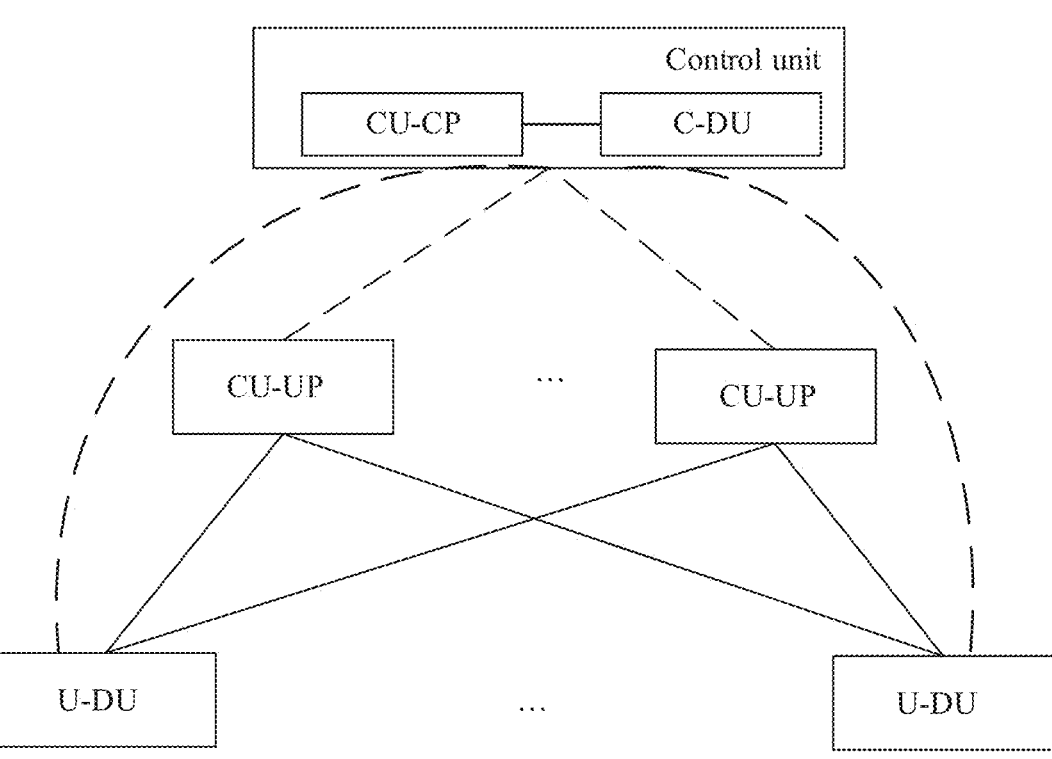
FIG. 4c is a schematic diagram 3 of protocol stacks of a control unit and a service unit according to an embodiment of this application.
FIG. 5 is a schematic diagram 1 of a connection relationship of a control unit and a service unit according to an embodiment of this application.

In a possible design, as shown in FIG. 4c, the terminal device maintains an RRC connection by using a cNB, and performs carrier aggregation on the user plane by connecting a plurality of sNBs. In this case, the plurality of sNBs separately have independent functions of the PHY layer, and the plurality of sNBs have same functions of the SDAP layer, the PDCP layer, the RLC layer, and the MAC layer. In this protocol stack, data of the terminal device may be aggregated from different physical layers into a same MAC layer.

In this embodiment of this application, a logical relationship between the CU-CP, the CU-UP, the C-DU, and the U-DU may not be limited. The logical relationship is described below by using an example.

The CU-CP and the C-DU may be coupled together, or may be used as two independent logical entities. In the following example descriptions of the logical relationship, the CU-CP and the C-DU may be described as a whole, and the control unit is used for description. When a logical relationship between the control unit and another part is involved, the logical relationship may be a logical relationship between an independent logical entity CU-CP and the another part, a logical relationship between an independent logical entity C-DU and the another part, or a logical relationship between the another part and a CU-CP and a C-DU that are coupled together. One CU-CP may be connected to one C-DU.

Example 1

As shown in FIG. 5, one control unit may be connected to one or more CU-UPS, and one CU-UP is connected to only one control unit: in other words, the control unit and the CU-UP are in a one-to-many relationship.

One control unit may be connected to one or more U-DUs, and one U-DU is connected to only one control unit: in other words, the control unit and the U-DU are in a one-to-many relationship.

One CU-UP may be connected to one or more U-DUs, and one U-DU may also be connected to one or more CU-UPs: in other words, the CU-UP and the U-DU are in a many-to-many relationship.

Example 2

Figures 6, 7:
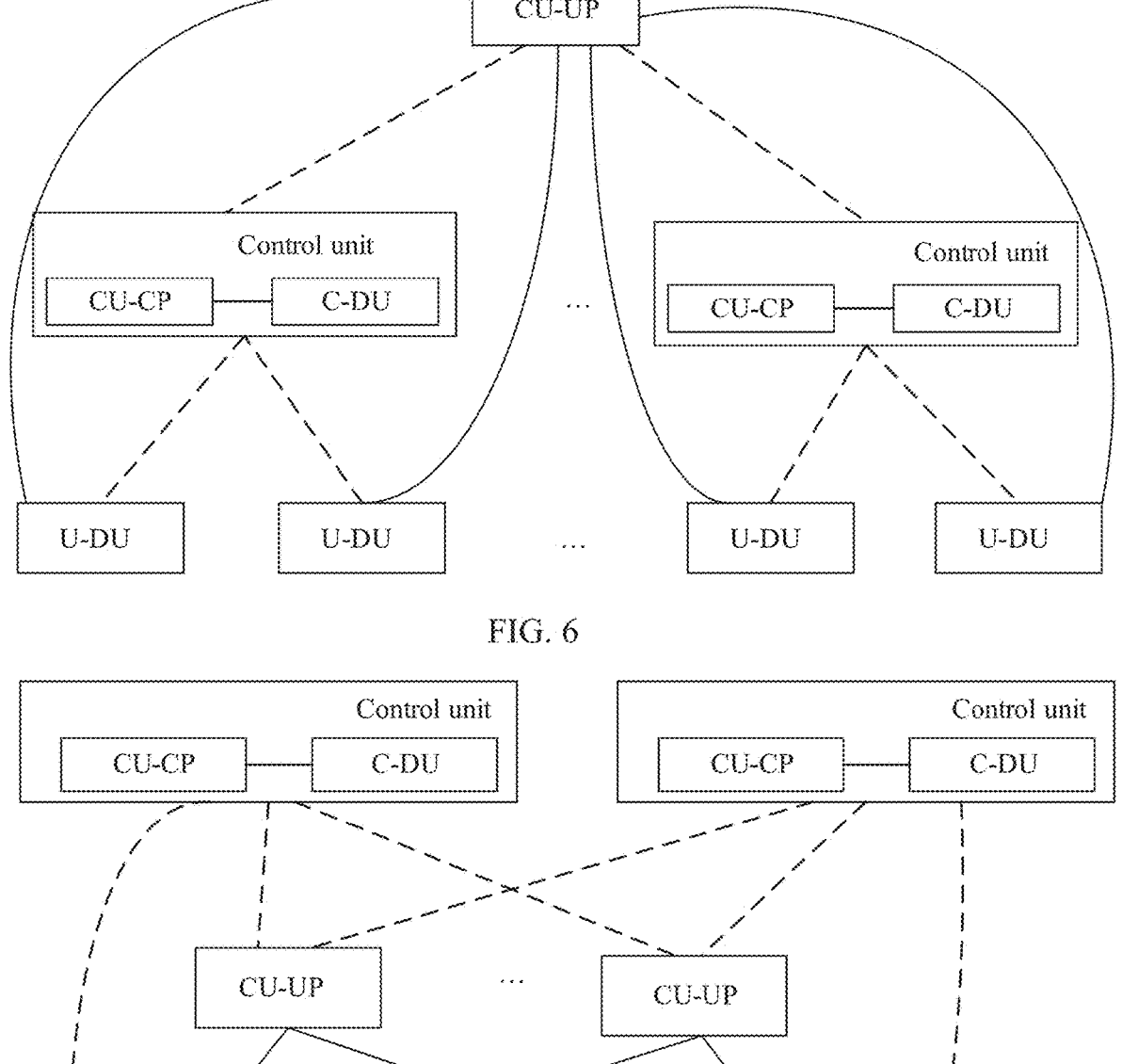
FIG. 6 is a schematic diagram 2 of a connection relationship of a control unit and a service unit according to an embodiment of this application.
FIG. 7 is a schematic diagram 3 of a connection relationship of a control unit and a service unit according to an embodiment of this application.

As shown in FIG. 6, one CU-UP may be connected to one or more control units, and one control unit is connected to only one CU-UP: in other words, the control unit and the CU-UP are in a many-to-one relationship.

One control unit may be connected to one or more U-DUs, and one U-DU is connected to only one control unit: in other words, the control unit and the U-DU are in a one-to-many relationship.

One CU-UP may be connected to one or more U-DUs, and one U-DU is connected to only one CU-UP: in other words, the CU-UP and the U-DU are in a one-to-many relationship.

Example 3

As shown in FIG. 7, one CU-UP may be connected to one or more control units, and one control unit may also be connected to one or more CU-UPs: in other words, the control unit and the CU-UP are in a many-to-many relationship.

One control unit may be connected to one or more U-DUs, and one U-DU is connected to only one control unit: in other words, the control unit and the U-DU are in a one-to-many relationship.

One CU-UP may be connected to one or more U-DUs, and one U-DU may also be connected to one or more CU-UPs: in other words, the CU-UP and the U-DU are in a many-to-many relationship.

It may be understood that in FIG. 2*a*, FIG. 3, and FIG. 5 to FIG. 7, an ellipsis is used to indicate "a plurality of". In FIG. 5 to FIG. 7, when there are a plurality of different devices in a same figure, quantities of different devices may be the same or different. In FIG. 5 to FIG. 7, a dashed line may represent a connection of a control plane, and a solid line may represent a connection of a user plane.

Figures 8, 9:
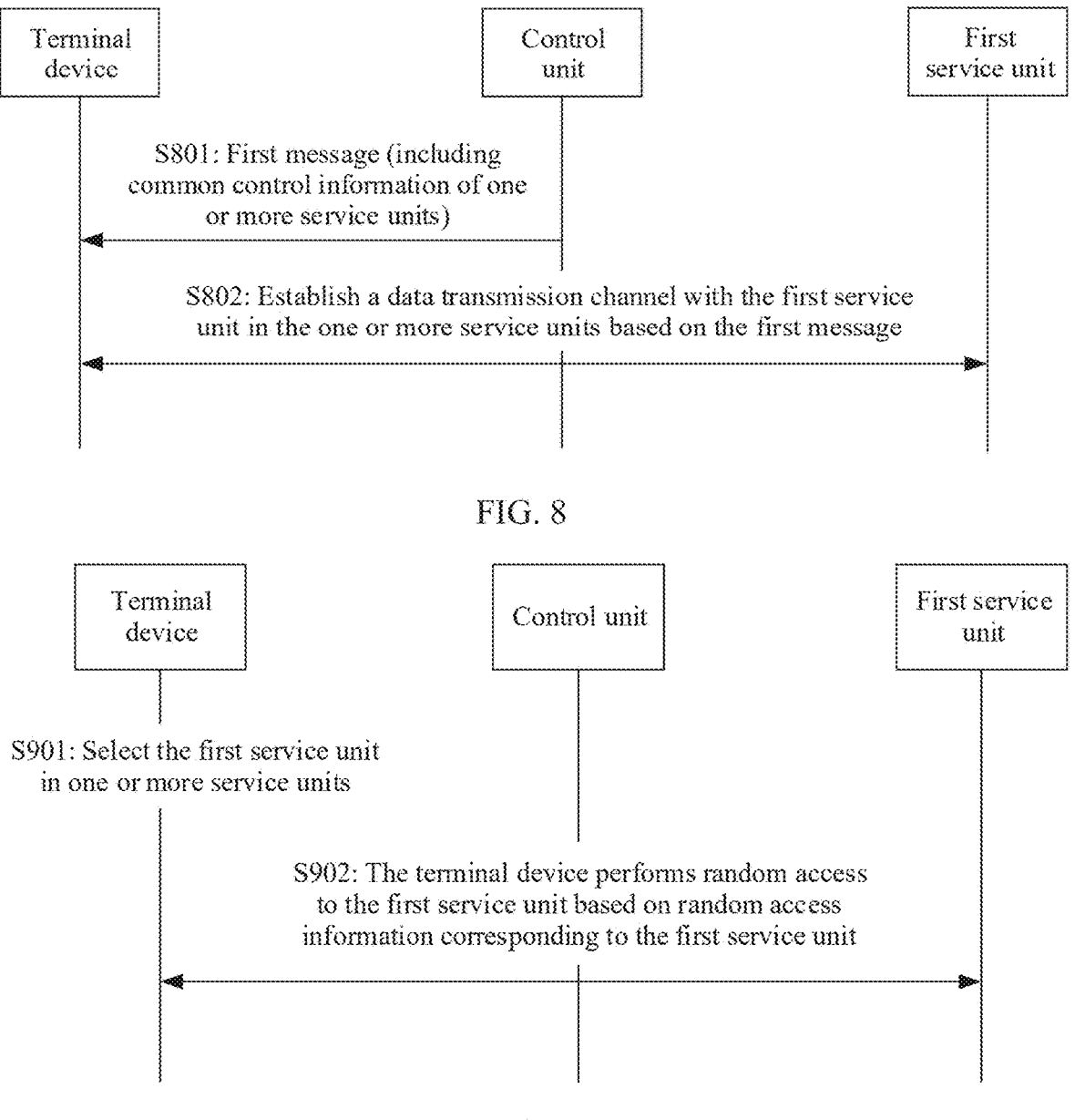
FIG. 8 is a schematic flowchart 1 of a communication method according to an embodiment of this application.
FIG. 9 is a schematic diagram 1 of a procedure used by a terminal device to perform access according to an embodiment of this application.

An access network architecture provided in embodiments of this application is described above. Based on the access network architecture, an embodiment of this application provides some communication procedures. As shown in FIG. 8, a procedure of a communication method provided in an example of this application is described as follows. The method may be based on the access network architecture provided in embodiments of this application.

S801: A control unit sends a first message to a terminal device, and the terminal device receives the first message from the control unit.

The first message includes common control information of one or more service units.

S802: The terminal device establishes a data transmission channel with a first service unit in the one or more service units based on the first message, where the data transmission channel is used to transmit data between the terminal device and the first service unit.

There may be one or more first service units.

Through decoupling of the control unit and the service unit, the control unit provides network camping and network discovery and access, and the common control information may be transmitted on a low frequency carrier to implement relatively wide coverage. For example, the common control information may be transmitted in frequency domain of sub 3G. The service unit is user-centered, and a plurality of service units can provide a plurality of paths of data and flexibly collaborate with each other. User data of the service unit may be transmitted at a high frequency, for example, may be transmitted in frequency domain of 6G or a millimeter microwave (mm Wave), and because high-frequency bandwidth has a high rate and provides a capacity gain, a peak rate of Tbps can be implemented. Through decoupling of the control unit and the service unit, the common control information and the user data are prevented from being bound to a same high-frequency carrier for transmission, and frequent handover of the terminal device when moving in a cell due to small coverage of the high-frequency bandwidth is further avoided. Through decoupling of the control unit and the service unit, because the common control information can be transmitted on a low-frequency carrier, and the user data of the service unit can be transmitted on a high-frequency carrier, a handover frequency of the terminal device is reduced, and mobility performance of the terminal device is improved.

Several optional implementations of the embodiment of FIG. 8 are described below; including a random access process and an RRC connection setup process of the terminal device. An applicable scenario includes: When the terminal device receives a downlink paging message or the terminal device needs to send uplink data, an RRC connection setup process and a random access process are triggered.

Based on the embodiment in FIG. 8, as shown in FIG. 9, a possible procedure used by the terminal device to perform access is described as follows:

S901: The terminal device selects the first service unit in the one or more service units.

S902: The terminal device performs random access to the first service unit based on random access information corresponding to the first service unit.

Optionally, the terminal device may select the first service unit based on common control information of the one or more service units that is included in the first message. For example, the common control information may include a selection rule, and the selection rule is used by the terminal device to select the first service unit from the one or more service units. The selection rule may include one or more of the following: a service unit with good signal quality is preferably selected, or a service unit with light load is preferably selected. Certainly, another selection rule may alternatively be used. The terminal device may measure signal quality of each service unit, or may measure a load status of each service unit, and select the first service unit from the one or more service units based on the selection rule.

The common control information further includes random access information separately corresponding to the one or more service units. The random access information may include a random access resource. The terminal device may determine, based on the random access information that is separately corresponding to the one or more service units and that is included in the common control information, the random access information corresponding to the first service unit. Random access to the first service unit is performed based on the random access information corresponding to the first service unit.

In a scenario, in a non-connected mode, the terminal device camps on a cell of the control unit, the control unit sends the first message to the terminal device. The first message includes the common control information of the one or more service units, and the common control information is information related to all service units connected to the control unit. The common control information includes a selection rule and random access information. The terminal device selects the first service unit based on the selection rule, for example, selects a service unit with best signal quality or a service unit with lightest load. Random access is initiated on a random access resource of a random access channel of the first service unit based on the random access information.

In a network architecture in which a control unit and a service unit are decoupled, the random access process in FIG. 9 may have the following several possible examples.

Figures 10, 11:
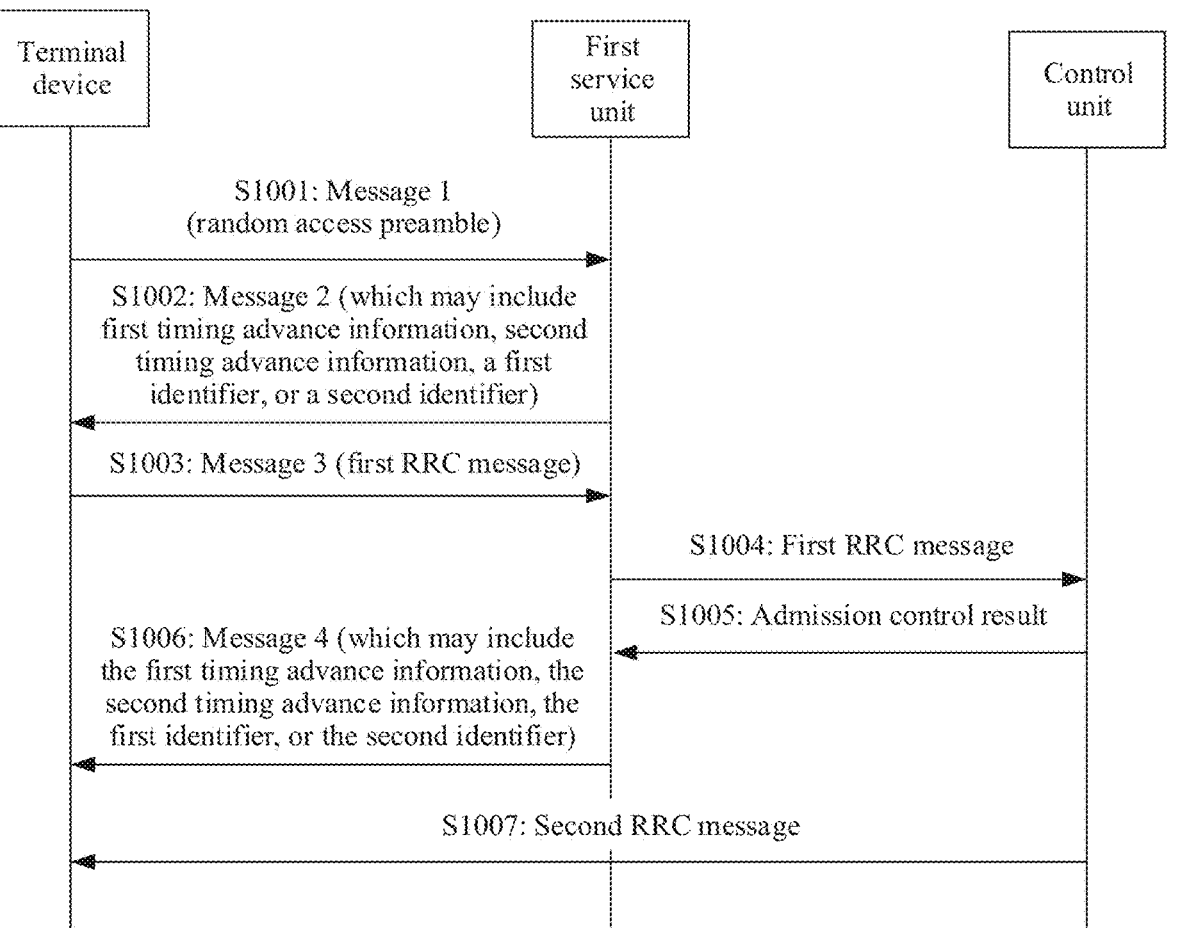
FIG. 10 is a schematic flowchart of random access of a terminal device to a first service unit according to an embodiment of this application.
FIG. 11 is a schematic diagram 1 of a format of timing adjustment information carried in a MAC RAR according to an embodiment of this application.

As shown in FIG. 10, a process of random access of the terminal device to the first service unit is described as follows:

S1001: The terminal device sends a message 1 (Msg1) to the first service unit, and the first service unit receives the message 1 (Msg1) from the terminal.

The message 1 may be a random access preamble (RAP).

If the control unit broadcasts several random access preambles of the first service unit by using the common control information, when the terminal device needs to initiate a random access process, one of the several received random access preambles is randomly selected, and the selected random access preamble is sent to the first service unit. In non-contention random access, the random access preamble may be a dedicated preamble allocated by the control unit to the terminal device.

S1002: The first service unit sends a message 2 (Msg2) to the terminal device, and the terminal device receives the message 2 from the first service unit.

The message 2 is a random access response (RAR).

The message 2 may carry some information. For example, the message 2 may carry timing adjustment information between the terminal device and the first service unit. The timing adjustment information may be a timing advance (TA). For distinguishing, the timing adjustment information between the terminal device and the first service unit is recorded as first timing adjustment information. The message 2 may further carry second timing adjustment information between the terminal device and the control unit. The first service unit may estimate and calculate the second timing adjustment information by using the first timing adjustment information.

Because there is a specific round trip delay (RTD) between the terminal and the network device, a time synchronization point of the terminal is inconsistent with a time synchronization point of the network device. To eliminate a time synchronization deviation between the terminal and the network device, the terminal needs to perform time adjustment before transmitting a signal, and transmit the signal based on the time synchronization point of the network device, to ensure that the signal of the terminal can accurately fall within a receive time window of the network device. Because the network device includes the control unit and the service unit, the first service unit in this embodiment of this application sends first timing advance information and second timing advance information to the terminal, and the terminal may separately obtain timing advance information with the control unit and the first service unit, perform time adjustment by using the second timing adjustment information when communicating with the control unit, and perform time adjustment by using the first timing adjustment information when communicating with the first service unit, to ensure time synchronization between the terminal device and both the control unit and the first service unit.

A TA value may be positive or negative. If the TA value is positive, it indicates that transmitting time of the terminal needs to be advanced, and if the TA value is negative, it indicates that the transmitting time of the terminal needs to be delayed.

The terminal device establishes or recovers uplink synchronization by using the message 2 for random access. A newly-powered-on terminal device, a terminal device in a non-connected mode, a terminal device in an out-of-synchronization state, and a switched terminal device all need to implement uplink synchronization through random access.

The message 2 may further carry a cell radio network temporary identifier (C-RNTI) allocated by the first service unit to the terminal device, and the cell radio network temporary identifier is denoted as a first identifier. The message 2 may further carry a second identifier allocated by the control unit to the terminal device. Because the terminal device needs to communicate with both the control unit and the first service unit, both the control unit and the first service unit need to allocate an identifier to the terminal device. When communicating with the control unit, the terminal device may use the second identifier. When communicating with the first service unit, the terminal device may use the first identifier. The first service unit may obtain the second identifier from the control unit, or the first service unit may allocate the second identifier to the terminal device. The second identifier is used by the control unit to identify the terminal device.

Certainly, the message 2 may further carry some other information, such as an uplink grant (UL-Grant) allocated to the terminal device, or information about the random access preamble received by the first service unit.

S1003: The terminal device sends a message 3 (Msg3) to the first service unit, and the first service unit receives the message 3 (Msg3) from the terminal device.

Optionally, the terminal device sends the message 3 on an uplink resource based on the UL-Grant that is allocated to the terminal device and that is carried in the message 2.

The message 3 may be an RRC message, and is recorded as a first RRC message herein. For example, the first RRC message is an RRC connection request message. For another example, the first RRC message may be an RRC connection resume request message, and is used to request to resume an RRC connection.

S1004: The first service unit sends the first RRC message to the control unit, and the control unit receives the first RRC message from the first service unit.

Because an RRC function is located in the control unit, after receiving the message 3, the first service unit parses out the first RRC message from the message 3, and transfers the first RRC message to the control unit through an interface between the first service unit and the control unit.

S1005: The control unit performs admission control, and returns an admission control result to the first service unit, and the first service unit receives the admission control result from the control unit.

S1006: The first service unit sends a message 4 (Msg4) to the terminal device, and the terminal device receives the message 4 from the first service unit.

In a non-contention random access process, the step of the message 4 may be omitted.

In an optional implementation, some or all of the first timing adjustment information, the second timing adjustment information, the first identifier, and the second identifier carried in the message 2 may be carried in the message 4.

S1007: After performing admission control, the control unit returns a second RRC message to the terminal device, and the terminal device receives the second RRC message from the control unit.

The second RRC message is used to respond to the first RRC message. For example, the first RRC message is an RRC connection request message, and the second RRC message is an RRC connection setup message. For another example, the first RRC message may be an RRC connection resume request message, and the second RRC message is an RRC connection resume message.

There is no strict sequence of performing S1007 and S1006, and S1007 and S1006 may be performed after sequences are exchanged, or may be performed in parallel.

When the message 2 carries the first timing adjustment information and the second timing adjustment information, a structure of the message 2 needs to be adjusted. It is assumed that the first timing adjustment information is a first TA value, and the second timing adjustment information is a second TA value. The first TA value and the second TA value may be placed in one MAC RAR, or may be included in different MAC RARs.

As shown in FIG. 11, the first TA value and the second TA value may be placed in one MAC RAR. For example, the MAC RAR further includes a UL-Grant and a first identifier that are allocated by the first service unit to the terminal device. R is a reserved bit.

In a possible implementation, the first timing adjustment information and the second timing adjustment information may be included in different MAC RARs. For example, the first timing adjustment information is carried in a first MAC RAR, and the second timing adjustment information is carried in a second MAC RAR. A header of the first MAC RAR carries first indication information, and the first indication information is used to indicate that the first MAC RAR carries the timing adjustment information between the terminal device and the first service unit. A header of the second MAC RAR carries second indication information, and the second indication information is used to indicate that the second MAC RAR carries timing adjustment information between the terminal device and a second service unit.

Figures 12, 13:
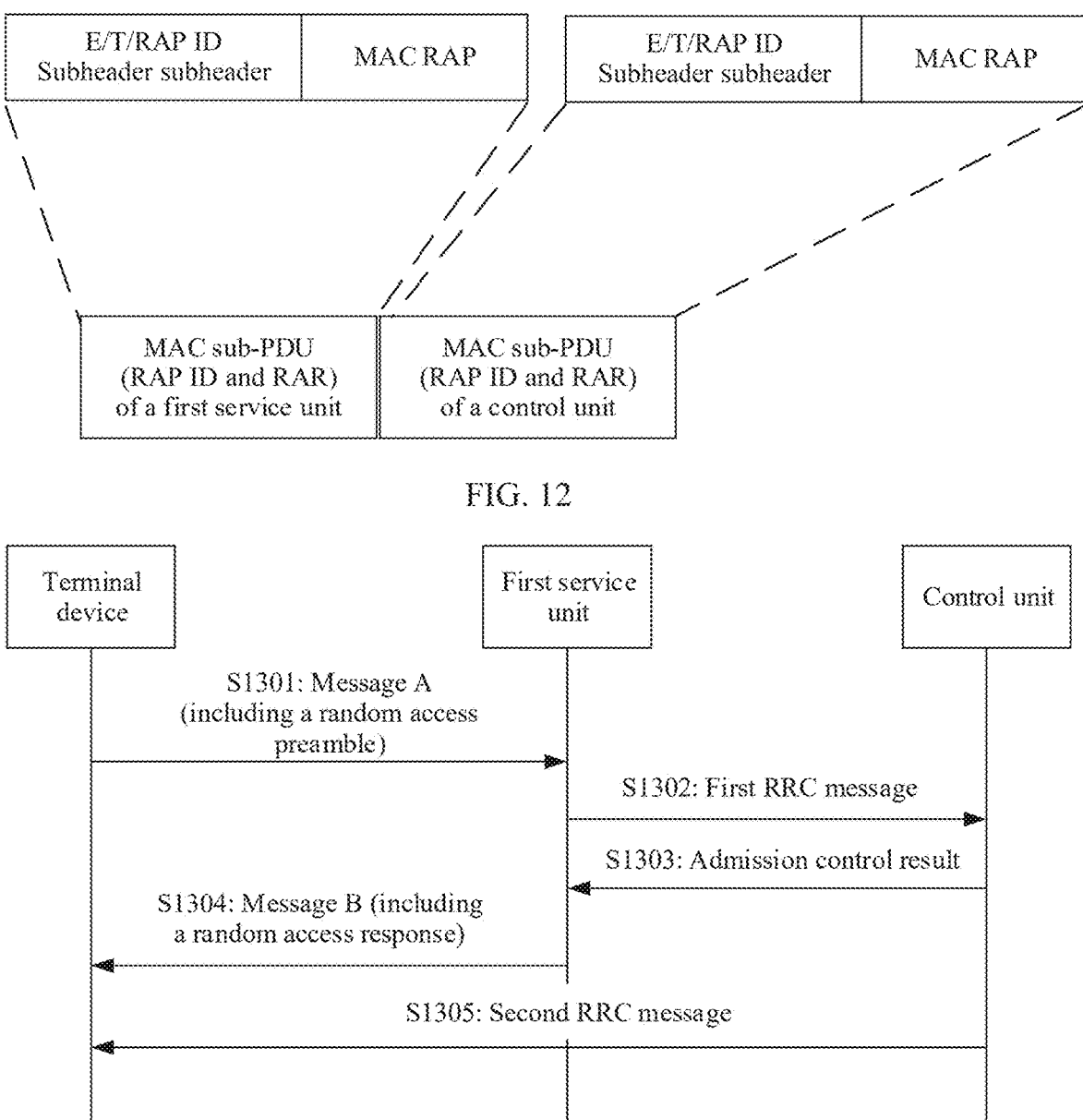
FIG. 12 is a schematic diagram 2 of a format of timing adjustment information carried in a MAC RAR according to an embodiment of this application.
FIG. 13 is a schematic diagram 2 of a procedure used by a terminal device to perform access according to an embodiment of this application.

As shown in FIG. 12, the first TA value and the second TA value may be included in different MAC RARs. For example, the first TA value is carried in a first MAC RAR, and the second TA value is carried in a second MAC RAR. The two MAC RARs correspond to two MAC sub-PDUs (MAC subPDU) of the first service unit.

T is used to indicate whether a MAC sub-header includes a random access preamble identifier (RAP ID). The RAP ID is used to indicate a RAP identifier carried in the MSG 1. RAP IDs of two MAC sub-PDUs are the same. An additional bit of indication may be added to the MAC sub-header to distinguish whether the MAC RAR carries a TA of the first service unit or a TA of a cNB. Whether the MAC RAR carries a TA of the first service unit or a TA of the control unit may alternatively be distinguished in sequence. For example, a MAC RAR that carries the TA of the first service unit is arranged before a MAC RAR that carries the TA of the control unit.

Based on a technical concept that is same as that in FIG. 10, if a random access process is two-step random access, as shown in FIG. 13, a process of two-step random access is described as follows:

S1301: The terminal device sends a message A (MsgA) to the first service unit, and the first service unit receives the message A (MsgA) from the terminal.

The message A may include a random access preamble. For an operation of sending the random access preamble by the terminal device in this step, refer to descriptions in S1001.

The message A may also include a message 3. For the message 3 in the message A, refer to descriptions of the message 3 in S1003.

S1302: The first service unit sends the first RRC message to the control unit, and the control unit receives the first RRC message from the first service unit.

Because an RRC function is located in the control unit, after receiving the message 3, the first service unit parses out the first RRC message from the message 3, and transfers the first RRC message to the control unit through an interface between the first service unit and the control unit.

S1303: The control unit performs admission control, and returns an admission control result to the first service unit, and the first service unit receives the admission control result from the control unit.

S1304: The first service unit sends a message B (MsgB) to the terminal device, and the terminal device receives the message B from the first service unit.

The message B may include a random access response. The message B may also carry information carried in the message 2 in S1002. When the message B carries the message 2, refer to descriptions of the message 2 in FIG. 10. The message B may also include the message 4 in FIG. 10, and the message B may also carry information carried in the message 4 in FIG. 10. When the message B carries the message 4, refer to descriptions of the message 4 in FIG. 10.

S1305: After performing admission control, the control unit returns a second RRC message to the terminal device, and the terminal device receives the second RRC message from the control unit.

For this step, refer to descriptions of S1007.

There is no strict sequence of performing S1305 and S1304, and S1305 and S1304 may be performed after sequences are exchanged, or may be performed in parallel.

Figure 14:
FIG. 14 is a schematic diagram 3 of a procedure used by a terminal device to perform access according to an embodiment of this application.

Based on the embodiment in FIG. 8, as shown in FIG. 14, another possible procedure used by the terminal device to perform access is described as follows:

S1401: The terminal device sets up an RRC connection to the control unit.

A process of setting up the RRC connection is not limited in this embodiment of this application. For example, the terminal device sends an RRC setup request message to the control unit, the control unit returns an RRC setup message to the terminal device, and the terminal device sends an RRC setup complete message to the control unit, to complete a procedure of setting up the RRC connection.

In a process of setting up the RRC connection between the terminal device and the control unit, the terminal device may obtain second timing adjustment information between the control unit and the terminal device, and may further obtain a second identifier allocated by the control unit to the terminal device.

S1402: The control unit sends an RRC message to the terminal device, where the RRC message is denoted as a third RRC message; and the terminal device receives the third RRC message from the control unit.

The third RRC message is used to indicate, to the terminal device, the first service unit selected for the terminal device, and may be further used to indicate access information of the first service unit. The access information is used by the terminal device to perform random access to the first service unit.

The third RRC message includes an identifier of the first service unit, and may further include random access information corresponding to the first service unit.

The third RRC message may further include first timing adjustment information between the first service unit and the terminal device, and may further include a first identifier used by the first service unit to identify the terminal device.

S1403: The terminal device performs random access to the first service unit based on random access resource information corresponding to the first service unit.

When communicating with the first service unit, the terminal device performs time adjustment by using the first timing adjustment information, and may further identify the terminal device by using the first identifier. When communicating with the control unit, the terminal device performs time adjustment by using the second timing adjustment information, and may further identify the terminal device by using a second identifier.

Optionally, after S1401 and before S1402, one or more of the following steps may be further included.

S1404: The control unit obtains context of the terminal device from a core network.

For example, the control unit sends an initial UE context message to the core network, and the core network returns a UE context setup request message to the control unit.

S1405: The control unit selects the first service unit for the terminal device.

The control unit selects, from the one or more service units connected to the control unit, a first service unit that serves the terminal device.

If the control unit has obtained the context of the terminal device, the control unit may select the first service unit based on the context of the terminal device.

S1406: The control unit sends a request message to the first service unit, and the first service unit receives the request message from the control unit.

The request message carries the context of the terminal device, and may further carry bearer-related information of the terminal device.

S1407: The first service unit sends an acknowledgment message of the request message to the control unit, and the control unit receives the acknowledgment message from the first service unit.

The acknowledgment message may carry access information of the first service unit, for example, the access information includes a random access resource.

Figure 15:
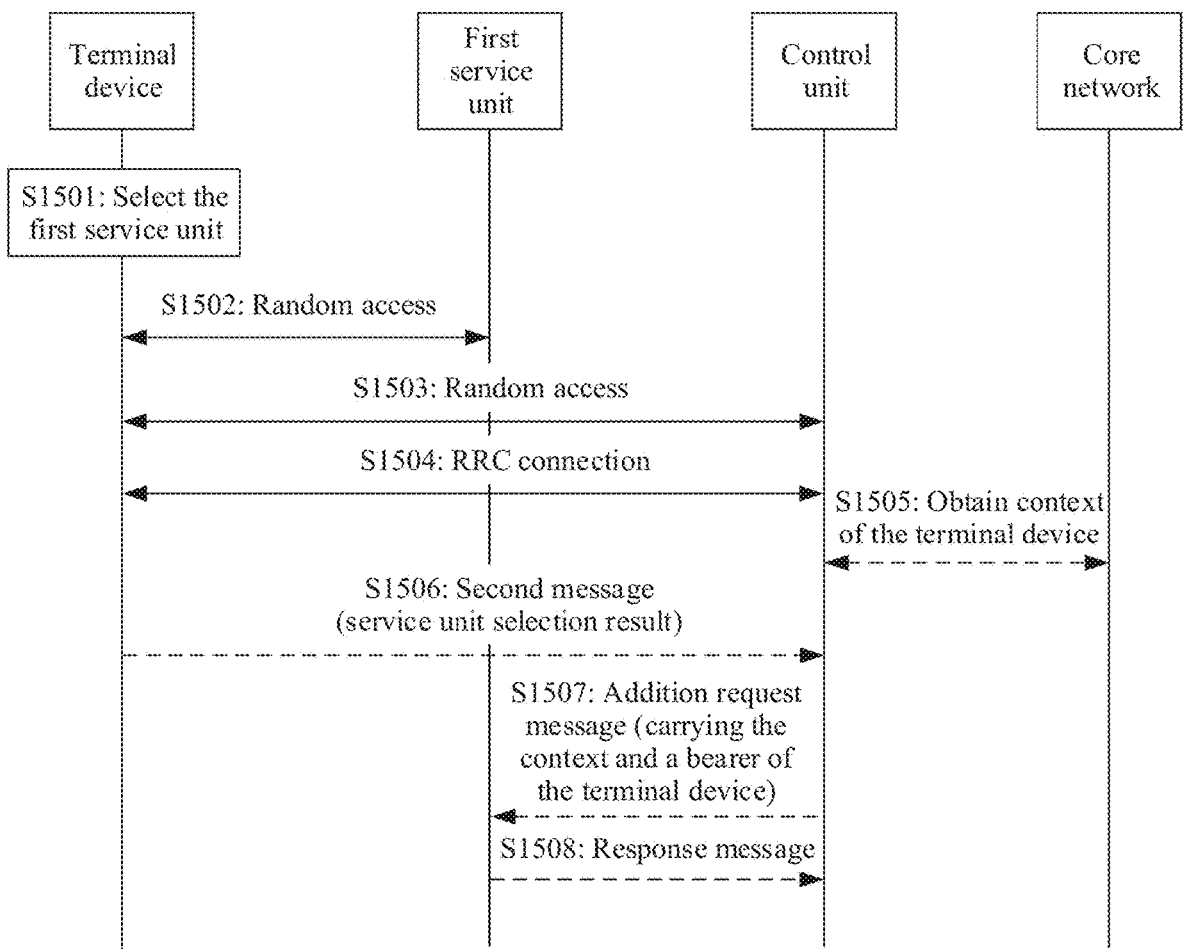
FIG. 15 is a schematic diagram 4 of a procedure used by a terminal device to perform access according to an embodiment of this application.

Based on the embodiment in FIG. 8, as shown in FIG. 15, still another possible procedure used by the terminal device to perform access is described as follows:

S1501: The terminal device selects the first service unit in the one or more service units.

This step is the same as step S901 in FIG. 9. Refer to descriptions of this step in FIG. 9.

S1502: The terminal device performs random access to the first service unit.

For random access of the terminal device to the first service unit, refer to the embodiment of FIG. 10 or FIG. 13.

S1503: The terminal device performs random access to the control unit.

There is no strict sequence of performing S1502 and S1503, and sequences of S1502 and S1503 may be exchanged, or S1502 and S1503 may be performed in parallel.

S1504: The terminal device sets up an RRC connection to the control unit.

For this step, refer to S1401. Repeated parts are not described again.

Optionally, after S1504, the following steps may be further included.

S1505: The control unit obtains context of the terminal device from a core network.

For this step, refer to S1404. Repeated parts are not described again.

S1506: The terminal device sends a second message to the control unit, and the control unit receives the second message from the terminal device.

The second message is used to indicate a service unit selection result of the terminal device.

For example, the second message may include an identifier of the first service unit, and may further include a first identifier of the terminal device. The first identifier is an identifier allocated by the first service unit to the terminal device, or the first identifier is an identifier used by the first service unit to identify the terminal device.

Optionally, in a possible alternative solution of S1506, the first service unit sends the service unit selection result of the terminal device to the control unit. For example, the first service unit sends a message that carries the identifier of the first service unit to the control unit, and the message may further carry the first identifier of the terminal device. The control unit learns, by receiving the message from the first service unit, that the service unit selection result of the terminal device is the first service unit.

S1507: The control unit sends an addition request message (SU addition request) to the first service unit, and the first service unit receives the addition request message from the control unit.

The addition request message may carry the context of the terminal device, may further carry bearer-related information of the terminal device, and may further carry the first identifier of the terminal device. The first identifier is used by the first service unit to identify the terminal device.

S1508: The first service unit returns an acknowledgment message (SU addition ack) of the addition request message to the control unit, and the control unit receives the acknowledgment message from the first service unit.

The terminal device stores a signaling connection to the control unit. When communicating with the first service unit, the terminal device performs time adjustment by using the first timing adjustment information, and may further identify the terminal device by using the first identifier. When communicating with the control unit, the terminal device performs time adjustment by using the second timing adjustment information, and may further identify the terminal device by using a second identifier.

It should be noted that descriptions of embodiments of this application may be mutually referenced. Each signaling name involved in embodiments of this application is merely an example, and may be changed to another name. This also falls within the protection scope of this application.

In a network architecture in which a control unit and a service unit are decoupled, an embodiment of this application provides a secure encryption method. The secure encryption method is specifically described as follows:

In a possible design 1:

A core network generates a first root key and a second root key. The first root key is used for security between a control unit and a terminal device, and the second root key is used for security between a service unit and the terminal device.

The terminal device may determine a control-plane security key based on the first root key, and may determine a user-plane security key based on the second root key.

Similarly, the control unit may determine a control-plane security key based on the first root key, and the service unit may determine a user-plane security key based on the second root key.

In another possible design 2:

A core network generates a first root key, and the first root key is used for security between a control unit and a terminal device.

The terminal device may derive a second root key based on the first root key, and the second root key is used for security between a service unit and the terminal device. The terminal device determines a control-plane security key based on the first root key, and may also determine a user-plane security key based on the second root key.

Similarly, the control unit may derive a second root key based on the first root key, and the second root key is used for security between a service unit and the terminal device. The terminal device determines a control-plane security key based on the first root key, and the service unit may determine a user-plane security key based on the second root key. The control unit may send the second root key to the service unit.

For the design 1 and the design 2, there are the following possible implementations.

The control-plane security key is a security key used by the terminal device and the control unit for signaling on the control unit, and the user-plane security key is a security key used by the terminal device and the service unit for a session on the service unit.

The terminal device may perform, based on the control-plane security key, at least one of the following operations on signaling used for communication between the terminal device and the control unit: encryption, decryption, integrity protection, or integrity verification.

The terminal device may perform, based on the user-plane security key, at least one of the following operations on a session on the terminal device and the service unit: encryption, decryption, integrity protection, or integrity verification.

The control unit may perform, based on the control-plane security key, at least one of the following operations on signaling used for communication between the terminal device and the control unit: encryption, decryption, integrity protection, or integrity verification.

The service unit may perform, based on the user-plane security key, at least one of the following operations on a session on the terminal device and the service unit: encryption, decryption, integrity protection, or integrity verification.

Figure 16:
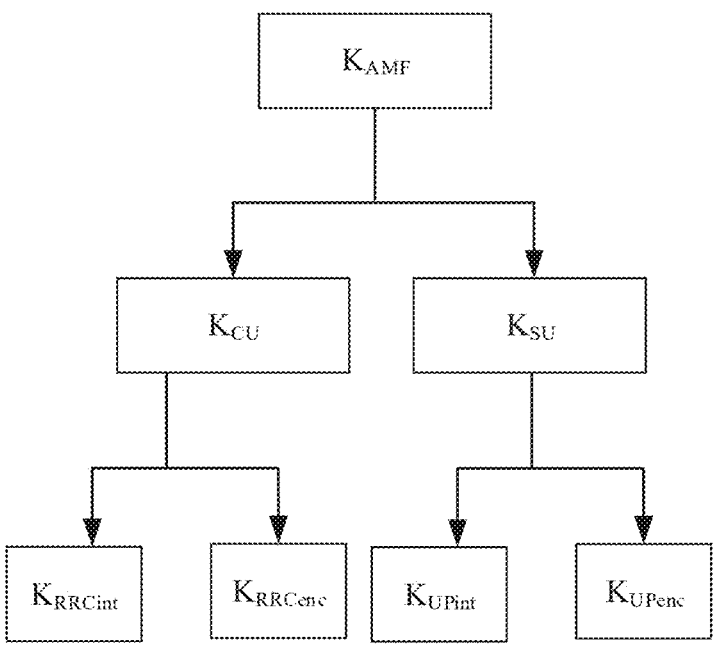
FIG. 16 is a schematic diagram 1 of a security key derivation manner according to an embodiment of this application.

For the design 1, as shown in FIG. 16, the first root key and the second root key may be determined by using a core network root key (for example, an access and mobility management function key $K_{AMF}$). The first root key is represented by Key, and the second root key is represented by $K_{SU}$. $K_{CU}$ and $K_{SU}$ may be determined by $K_{AMF}$. The terminal device may determine, based on $K_{CU}$, a key $K_{RRCene}$ used for air interface signaling encryption and a key $K_{RRCint}$ used for signaling integrity protection. The terminal device may determine, based on $K_{SU}$, a key $K_{UPene}$ used for user data encryption and a key $K_{UPint}$ used for user data integrity protection.

Optionally, the control unit may receive a message from the core network, and the message includes the first root key and the second root key. Before the control unit may receive the message from the core network, the control unit may further send an identifier of the service unit to the core network, and the core network may generate, based on the identifier of the service unit, a second root key of the service unit corresponding to the identifier. For example, in S1404 in the embodiment of FIG. 14, the control unit may obtain, from the core network, the identifier of the first service unit sent to the core network in signaling of the context of the terminal device, and receive the first root key and the second root key from the core network.

For another example, in S1505 in the embodiment of FIG. 15, the control unit may obtain, from the core network, the identifier of the first service unit sent to the core network in signaling of the context of the terminal device, and receive the first root key and the second root key from the core network.

Figure 17:
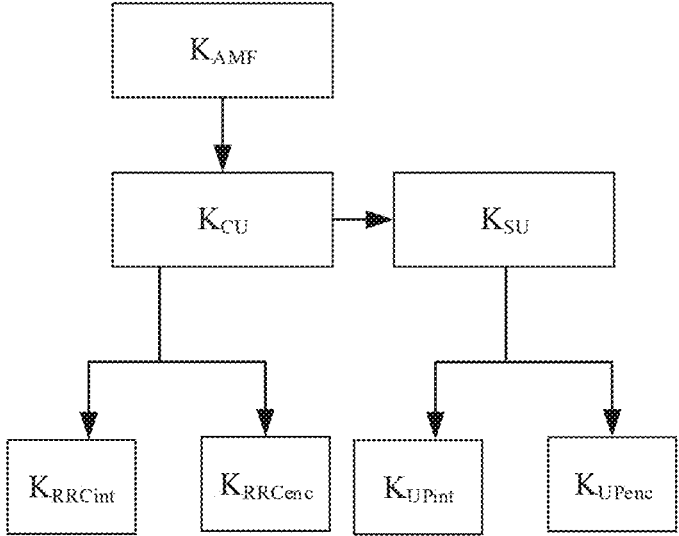
FIG. 17 is a schematic diagram 2 of a security key derivation manner according to an embodiment of this application.

For the design 2, as shown in FIG. 17, the first root key may be determined by $K_{AMF}$. The first root key is represented by Key, and the second root key is represented by $K_{SU}$. $K_{CU}$ may be determined by $K_{AMF}$, and then, $K_{SU}$ is determined by $K_{CU}$. The terminal device may determine, based on $K_{CU}$, a key $K_{RRCene}$ used for air interface signaling encryption and a key $K_{RRCint}$ used for signaling integrity protection. The terminal device may determine, based on $K_{SU}$, a key $K_{UPene}$ used for user data encryption and a key $K_{UPint}$ used for user data integrity protection.

Optionally, the control unit may receive a message from the core network, and the message includes the first root key. The control unit generates the second root key based on the first root key.

For example, in S1404 in the embodiment of FIG. 14, the control unit may obtain, from the core network, the first root key received from the core network in signaling of the context of the terminal device, and generate, based on the first root key, a second root key corresponding to the first service unit.

For another example, in S1505 in the embodiment of FIG. 15, the control unit may obtain, from the core network, the first root key received from the core network in signaling of the context of the terminal device, and generate, based on the first root key, a second root key corresponding to the first service unit.

In addition, a method for deriving $K_{AMF}$ in the embodiments of FIG. 16 and FIG. 17 is not limited in this application. For example, in NR, the terminal device stores a same long-term key K as that on a network side. When an authentication manner is primary authentication and key agreement (AKA) procedure authentication of a 5G system, the terminal device may generate a cipher key (CK) and an integrity key (IK) based on K, generate an authentication service function key $K_{AUSF}$ based on the CK, the IK, a service network name SN name, and the like, generate an anchor key $K_{SEAF}$ based on $K_{AUSF}$ and the SN name, and generate $K_{AMF}$ based on $K_{SEAF}$, a subscriber permanent identifier (SUPI), and an ABBA.

For another example, when an authentication manner is an improved extensible authentication protocol EAP AKA', the terminal device may generate a CK and an IK based on K, generate an intermediate cipher key CK' and an intermediate integrity key IK' based on the CK, the IK, an SN name, and the like, generate $K_{AUSF}$ based on the CK', the IK', and an SUPI, generate an anchor key $K_{SEAF}$ based on $K_{AUSF}$ and the SN name, and generate $K_{AMF}$ based on $K_{SEAF}$, the SUPI, and an ABBA.

Alternatively, $K_{AMF}$ may be obtained in another manner. This is not limited in this application.

It should be noted that examples of application scenarios in this application represent only some possible implementations, and are intended to better understand and describe the method in this application. Persons skilled in the art may obtain some examples in evolved forms based on the communication method provided in the application.

To implement functions in the methods provided in the foregoing embodiments of this application, the terminal device, the control unit, and the service unit may each include a hardware structure and/or a software module, and the foregoing functions are implemented in a form of a hardware structure, a software module, or a hardware structure and a software module. Whether one of the foregoing functions is performed in the manner of a hardware structure, a software module, or a hardware structure and a software module depends on a specific application and design constraints of the technical solutions.

Figure 18:
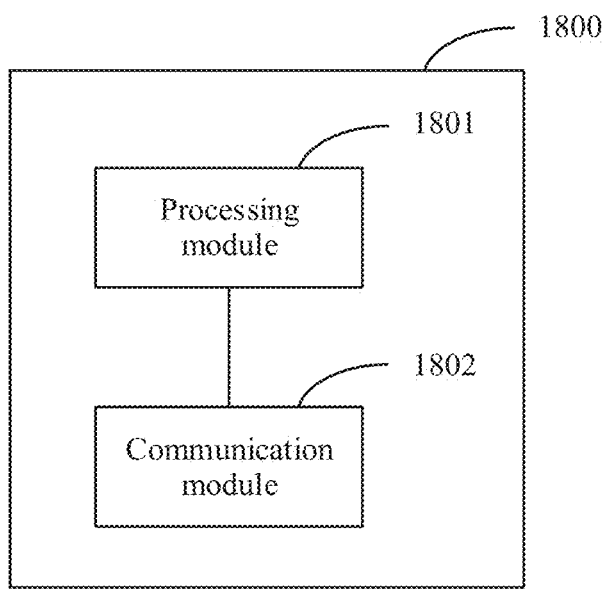
FIG. 18 is a schematic diagram 1 of a structure of a communication apparatus according to an embodiment of this application.

As shown in FIG. 18, based on a same technical concept, an embodiment of this application further provides a communication apparatus 1800. The communication apparatus 1800 may be used in the network architecture provided in embodiments of this application. The communication apparatus 1800 may be a terminal device, a control unit, or a first service unit, an apparatus in the terminal device, the control unit, or the first service unit, or an apparatus that can be used together with the terminal device, the control unit, or the first service unit. In a design, the communication apparatus 1800 may include corresponding modules for performing the method/operations/steps/actions performed by the terminal in the foregoing method embodiments. The module may be a hardware circuit or software, or may be implemented in a combination of a hardware circuit and software. In a design, the communication apparatus 1800 may include a processing module 1801 and a communication module 1802. The processing module 1801 is configured to invoke the communication module 1802 to perform a receiving and/or sending function.

When the communication apparatus 1800 is configured to perform an operation performed by the terminal device:

The communication module 1802 is configured to receive a first message from the control unit, and the first message includes common control information of the one or more service units.

The processing module 1801 is configured to establish a data transmission channel with a first service unit in the one or more service units based on the first message, and the data transmission channel is used to transmit data between the terminal device and the first service unit.

When the communication apparatus 1800 is configured to perform an operation performed by the control unit:

The communication module 1802 is configured to send a first message to the terminal device, and the first message includes common control information of the one or more service units.

When the communication apparatus 1800 is configured to perform an operation performed by the first service unit:

The processing module 1801 is configured to establish a data transmission channel with the terminal device. The data transmission channel is used to transmit data between the terminal device and the first service unit, and the first service unit is a service unit in the one or more service units.

The communication module 1802 is further configured to perform other receiving or sending steps or operations performed by the terminal, the control unit, or the first service unit in the foregoing method embodiments. The processing module 1801 may be further configured to perform corresponding steps or operations other than receiving/sending performed by the terminal, the control unit, or the first service unit in the foregoing method embodiments, and details are not described herein again.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 19:
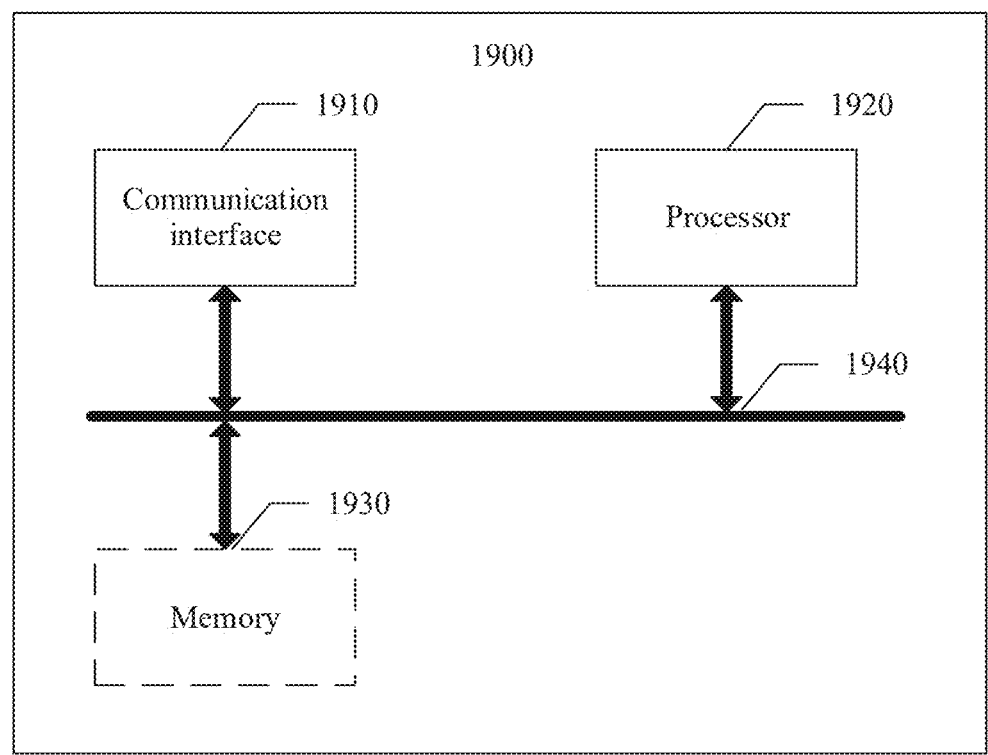
FIG. 19 is a schematic diagram 2 of a structure of a communication apparatus according to an embodiment of this application.

FIG. 19 shows a communication apparatus 1900 according to an embodiment of this application. The communication apparatus 1900 is configured to implement functions of the terminal device, the control unit, or the first service unit in the foregoing method. The communication apparatus may be a terminal device, a control unit, or a first service unit, an apparatus in the terminal device, the control unit, or the first service unit, or an apparatus that can be used together with the terminal device, the control unit, or the first service unit. The communication apparatus 1900 may be a chip system. In this embodiment of this application, the chip system may include a chip, or may include the chip and another discrete component. The communication apparatus 1900 includes at least one processor 1920, configured to implement functions of the terminal device, the control unit, or the first service unit in the method provided in embodiments of this application. The communication apparatus 1900 may further include a communication interface 1910. In this embodiment of this application, the communication interface may be a transceiver, a circuit, a bus, a module, or another type of communication interface, and is configured to communicate with another device by using a transmission medium. For example, the communication interface 1910 is configured to communicate with another device by using an apparatus in the communication apparatus 1900.

For example, when the communication apparatus 1900 is configured to perform an operation performed by the terminal device:

The communication interface 1910 is configured to receive a first message from the control unit, and the first message includes common control information of the one or more service units.

The processor 1920 is configured to establish a data transmission channel with a first service unit in the one or more service units based on the first message, and the data transmission channel is used to transmit data between the terminal device and the first service unit.

When the communication apparatus 1900 is configured to perform an operation performed by the control unit:

The communication interface 1910 is configured to send a first message to the terminal device, and the first message includes common control information of the one or more service units.

When the communication apparatus 1900 is configured to perform an operation performed by the first service unit:

The processor 1920 is configured to establish a data transmission channel with the terminal device. The data transmission channel is used to transmit data between the terminal device and the first service unit, and the first service unit is a service unit in the one or more service units.

The communication interface 1910 is further configured to perform other receiving or sending steps or operations performed by the terminal, the control unit, or the first service unit in the foregoing method embodiments. The processor 1920 may be further configured to perform corresponding steps or operations other than receiving/sending performed by the terminal, the control unit, or the first service unit in the foregoing method embodiments, and details are not described herein again.

The communication apparatus 1900 may further include at least one memory 1930, configured to store program instructions and/or data. The memory 1930 is coupled to the processor 1920. The coupling in this embodiment of this application is indirect coupling or a communication connection between apparatuses, units, or modules for information exchange between the apparatuses, the units, or the modules, and may be in electrical, mechanical, or other forms. The processor 1920 may cooperate with the memory 1930. The processor 1920 may execute the program instructions stored in the memory 1930. At least one of the at least one memory may be included in the processor.

A specific connection medium between the communication interface 1910, the processor 1920, and the memory 1930 is not limited in this embodiment of this application. In this embodiment of this application, in FIG. 19, the memory 1930, the processor 1920, and the communication interface 1910 are connected by using a bus 1940. The bus is represented by a bold line in FIG. 19. A connection manner between other components is merely a schematic description, and is not limited thereto. The bus may be classified into an address bus, a data bus, a control bus, and the like. For ease of representation, only one bold line is used for representation in FIG. 19, but this does not mean that there is only one bus or only one type of bus.

When the communication apparatus 1800 and the communication apparatus 1900 are specifically chips or chip systems, the communication module 1802 and the communication interface 1910 may output or receive baseband signals. When the communication apparatus 1800 and the communication apparatus 1900 are specifically devices, the communication module 1802 and the communication interface 1910 may output or receive radio-frequency signals.

This application provides an apparatus, and the apparatus may be configured to perform the method performed by the terminal device, the control unit, or the service unit. The apparatus includes at least one input interface (input(s)), a logic circuit, and at least one output interface (output(s)). Optionally, the logic circuit may be a chip or another integrated circuit that can implement the method in this application.

The input interface is configured to input or receive data. The output interface is configured to output or send data. The logic circuit is configured to perform the foregoing possible methods.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

In this embodiment of this application, the memory 1930 may be a non-volatile memory such as a hard disk drive (HDD) or a solid-state drive (SSD), or may be a volatile memory such as a random access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

Some or all of operations and functions performed by the terminal device, the control unit, or the service unit described in the foregoing method embodiments of this application may be completed by using a chip or an integrated circuit.

To implement functions of the communication apparatus described in FIG. 18 or FIG. 19, an embodiment of this application further provides a chip, including a processor, configured to support the communication apparatus in implementing functions of the terminal device, the control unit, or the service unit in the foregoing method embodiments. In a possible design, the chip is connected to a memory or the chip includes a memory, and the memory is configured to store program instructions and data that are required by the communication apparatus.

An embodiment of this application provides a computer-readable storage medium. The computer-readable storage medium stores a computer program, and the computer program includes instructions used for performing the foregoing method embodiments.

An embodiment of this application provides a computer program product including instructions. When the computer program product is run on a computer, the foregoing method embodiments are performed.

Persons skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to embodiments of this application without departing from the spirit and scope of embodiments of this application. In this case, this application is intended to cover these modifications and variations provided that they fall within the scope of protection defined by the following claims and their equivalent technologies.

What is claimed is:

1. A communication method, wherein the method is applied to a terminal device and a network architecture that comprises a control unit and one or more service units, the control unit is connected to the one or more service units, and the method comprises:

receiving, by the terminal device, a first message from the control unit, wherein the first message comprises common control information of the one or more service units;

wherein the common control information is transmitted between the control unit and the terminal device on a low frequency carrier, and user data of the one or more service units is transmitted between the terminal device and the one or more service units on a high frequency carrier;

establishing, by the terminal device, a data transmission channel with a first service unit in the one or more service units based on the first message, wherein the data transmission channel is used to transmit data between the terminal device and the first service unit;

performing, by the terminal device, random access to the first service unit, including receiving a random access response (RAR) message from the first service unit;

wherein the RAR message comprises first timing adjustment information between the terminal device and the first service unit and second timing adjustment information between the terminal device and the control unit;

wherein the first timing adjustment information and the second timing adjustment information are carried in a same Media Access Control (MAC) RAR; and sending, by the terminal device, a message 3 to the first service unit, and receiving, by the terminal device, a message 4 from the first service unit;

wherein the RAR message comprises a first identifier of the terminal device, and the message 4 comprises a second identifier of the terminal device, or the RAR message comprises the second identifier of the terminal device, and the message 4 comprises the first identifier of the terminal device, wherein the first identifier is allocated by the first service unit to the terminal device, and the second identifier is allocated by the control unit to the terminal device.

2. The method according to claim 1, wherein the control unit has functions of one or more of the following protocol layers: a radio resource control (RRC) layer, a packet data convergence protocol (PDCP) layer, a first radio link control (RLC) layer, a first MAC layer, or a first physical (PHY) layer; and the service unit has functions of one or more of the following protocol layers: a service data adaptation protocol (SDAP) layer, a PDCP layer, a second RLC layer, a second MAC layer, or a second PHY layer.

3. The method according to claim 1, wherein the common control information comprises random access information separately corresponding to the one or more service units; and wherein the method further comprises:

selecting, by the terminal device, the first service unit in the one or more service units; and performing, by the terminal device, the random access to the first service unit based on random access information corresponding to the first service unit.

4. The method according to claim 3, wherein the performing, by the terminal device, the random access to the first service unit based on the random access information corresponding to the first service unit comprises:

sending, by the terminal device, a random access preamble to the first service unit.

5. The method according to claim 4, wherein the method further comprises: sending, by the terminal device, a message 3 to the first service unit; and receiving, by the terminal device, a message 4 from the first service unit, wherein the message 3 comprises a first RRC message; and receiving, by the terminal device, a second RRC message from the control unit, wherein the second RRC message is used to respond to the first RRC message.

6. The method according to claim 5, wherein the first RRC message is an RRC connection request message, and the second RRC message is an RRC connection setup message; or the first RRC message is an RRC connection resume request message, and the second RRC message is an RRC connection resume message.

7. The method according to claim 3, wherein the common control information further comprises a selection rule, and the selection rule is used by the terminal device to select the first service unit from the one or more service units.

8. The method according to claim 3, further comprising:

setting up, by the terminal device, an RRC connection to the control unit; and/or performing, by the terminal device, random access to the control unit.

9. The method according to claim 8, further comprising:

sending, by the terminal device, a second message to the control unit, wherein the second message comprises one or more of the following information: an identifier of the first service unit or the first identifier allocated by the first service unit to the terminal device.

10. The method according to claim 8, wherein the control unit sends information about context and a data bearer of the terminal device to the first service unit based on the second message.

11. The method according to claim 1, further comprising:

setting up, by the terminal device, an RRC connection to the control unit, wherein the first message is a third RRC message, and the third RRC message comprises an identifier of the first service unit and random access information corresponding to the first service unit; and performing, by the terminal device, random access to the first service unit based on the random access information corresponding to the first service unit.

12. The method according to claim 1, further comprising:

communicating, by the terminal device, with the control unit by using the first identifier; and/or communicating, by the terminal device, with the first service unit by using the second identifier, wherein the first identifier is allocated by the first service unit to the terminal device, and the second identifier is allocated by the control unit to the terminal device.

13. The method according to claim 1, further comprising:

communicating, by the terminal device, with the control unit by using first timing adjustment information; and/or communicating, by the terminal device, with the first service unit by using second timing adjustment information, wherein the first timing adjustment information is timing adjustment information between the terminal device and the first service unit, and the second timing adjustment information is timing adjustment information between the terminal device and the control unit.

14. The method according to claim 1, wherein the common control information comprises one or more of the following: system information, a paging message, or an RRC message.

15. A communication apparatus, communicating with a network architecture comprising a control unit and one or more service units, wherein the communication apparatus comprises a processor and a receiver, wherein the receiver is configured to cooperate with the processor to receive a first message from the control unit, and the first message comprises common control information of the one or more service units;

wherein the common control information is transmitted between the control unit and a terminal device on a low frequency carrier, and user data of the one or more service units is transmitted between the terminal device and the one or more service units on a high frequency carrier;

the processor is configured to establish a data transmission channel with a first service unit in the one or more service units based on the first message, and the data transmission channel is used to transmit data between the communication apparatus and the first service unit;

perform, random access to the first service unit, including receiving a random access response (RAR) message from the first service unit;

wherein the RAR message comprises first timing adjustment information between the communication apparatus and the first service unit and second timing adjustment information between the communication apparatus and the control unit;

wherein the first timing adjustment information and the second timing adjustment information are carried in a same Media Access Control (MAC) RAR; and sending, by the terminal device, a message 3 to the first service unit, and receiving, by the terminal device, a message 4 from the first service unit;

wherein the RAR message comprises a first identifier of the terminal device, and the message 4 comprises a second identifier of the terminal device, or the RAR message comprises the second identifier of the terminal device, and the message 4 comprises the first identifier of the terminal device, wherein the first identifier is allocated by the first service unit to the terminal device, and the second identifier is allocated by the control unit to the terminal device.

16. The apparatus according to claim 15, wherein the control unit has functions of one or more of the following protocol layers: a radio resource control (RRC) layer, a packet data convergence protocol (PDCP) layer, a first radio link control (RLC) layer, a first MAC layer, or a first physical (PHY) layer; and the service unit has functions of one or more of the following protocol layers: a service data adaptation protocol (SDAP) layer, a PDCP layer, a second RLC layer, a second MAC layer, or a second PHY layer.

17. The apparatus according to claim 15, wherein the common control information comprises random access information separately corresponding to the one or more service units; and wherein the processor is further configured to:

select, the first service unit in the one or more service units; and perform, the random access to the first service unit based on random access information corresponding to the first service unit.

18. The apparatus according to claim 15, wherein in performing the random access to the first service unit based on the random access information corresponding to the first service unit, the processor is further configured to:

send, a random access preamble to the first service unit.

19. The apparatus according to claim 18, wherein the message 3 comprises a first RRC message; and the processor is further configured to:

receive, a second RRC message from the control unit, wherein the second RRC message is used to respond to the first RRC message.

20. The apparatus according to claim 19, wherein the first RRC message is an RRC connection request message, and the second RRC message is an RRC connection setup message; or the first RRC message is an RRC connection resume request message, and the second RRC message is an RRC connection resume message.

* * * * *